(12) United States Patent
Hersam et al.

(10) Patent No.: US 12,202,986 B2
(45) Date of Patent: Jan. 21, 2025

(54) TWO-DIMENSIONAL INSULATOR BASED PRINTABLE ION-CONDUCTIVE AND VISCOSITY-TUNABLE INKS, FABRICATING METHODS AND APPLICATIONS OF SAME

(71) Applicant: NORTHWESTERN UNIVERSITY, Evanston, IL (US)

(72) Inventors: Mark C. Hersam, Wilmette, IL (US); Ana Carolina Mazarin de Moraes, Chicago, IL (US); Jung-Woo Ted Seo, Naperville, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 319 days.

(21) Appl. No.: 17/438,967

(22) PCT Filed: Mar. 11, 2020

(86) PCT No.: PCT/US2020/021943
§ 371 (c)(1),
(2) Date: Sep. 14, 2021

(87) PCT Pub. No.: WO2020/251638
PCT Pub. Date: Dec. 17, 2020

(65) Prior Publication Data
US 2022/0145104 A1 May 12, 2022

Related U.S. Application Data

(63) Continuation-in-part of application No. PCT/US2019/053362, filed on Sep. 27, 2019.

(60) Provisional application No. 62/818,846, filed on Mar. 15, 2019, provisional application No. 62/740,574, filed on Oct. 3, 2018.

(51) Int. Cl.
| | |
|---|---|
| C09D 11/14 | (2006.01) |
| B41M 3/00 | (2006.01) |
| B41M 5/00 | (2006.01) |
| B41M 7/00 | (2006.01) |
| C09D 11/033 | (2014.01) |
| C09D 11/037 | (2014.01) |
| C09D 11/322 | (2014.01) |
| C09D 11/36 | (2014.01) |

(52) U.S. Cl.
CPC .......... *C09D 11/037* (2013.01); *B41M 3/006* (2013.01); *B41M 5/0023* (2013.01); *B41M 5/0047* (2013.01); *B41M 7/009* (2013.01); *C09D 11/033* (2013.01); *C09D 11/14* (2013.01); *C09D 11/322* (2013.01); *C09D 11/36* (2013.01)

(58) Field of Classification Search
CPC ....... C09D 11/03; C09D 11/033; C09D 11/14; C09D 11/322; C09D 11/36; B41M 3/006; B41M 5/0023; B41M 7/009; B41M 5/0047

USPC ......................................................... 523/160
See application file for complete search history.

(56) References Cited

U.S. PATENT DOCUMENTS

| | | | | |
|---|---|---|---|---|
| 2006/0163744 A1* | 7/2006 | Vanheusden | ...... | H01L 23/49883 257/E21.174 |
| 2011/0102528 A1* | 5/2011 | Tsuchimura | ......... | C07D 405/12 560/150 |
| 2013/0196469 A1* | 8/2013 | Facchetti | .......... | H01L 21/28506 438/778 |
| 2016/0262988 A1* | 9/2016 | Hayakawa | ............ | C08L 101/00 |
| 2018/0100080 A1* | 4/2018 | Hersam | ..................... | G03F 7/12 |
| 2018/0327618 A1* | 11/2018 | McManus | .............. | C09D 11/30 |

FOREIGN PATENT DOCUMENTS

| CN | 106867315 A | 6/2017 |
|---|---|---|
| KR | 10-2017-0037533 A | 4/2017 |

OTHER PUBLICATIONS

"Cellulose Nitrate", NIH: National Library of Medicine, pp. 1-48, Retrieved on Jun. 14, 2024 (Year: 2024).*
Joseph, A. M. et al., "Screen-printable electronic ink of ultrathin boron nitride nanosheets", Acs Omega, 2016, vol. 1, No. 6, pp. 1220-1228.
Janica, I. et al., "Thermal insulation with 2D materials: liquid phase exfoliated vermiculite functional nanosheets", Nanoscale, 2018, vol. 10, No. 48, pp. 23182-23190.
Gonzalez Ortiz, D. et al., "Exfoliation of hexagonal boron nitride (h-BN) in liquide phase by ion intercalation", Nanomaterials, 2018, vol. 8, No. 9, Article No. 716, pp. 1-12.
Korean Intellectual Property Office (ISR/KR), "International Search Report for PCT/US2020/021943", Korea, Jan. 14, 2021.
K. Novoselov, D. Jiang, F. Schedin, T. Booth, V. Khotkevich, S. Morozov, A. Geim, Proc. Natl. Acad. Sci.U.S.A. 2005, 102, 10451.

(Continued)

*Primary Examiner* — Hannah J Pak
(74) *Attorney, Agent, or Firm* — Locke Lord LLP; Tim Tingkang Xia, Esq.

(57) ABSTRACT

The invention relates to printable ion-conductive and viscosity-tunable inks based on two-dimensional (2D) insulators, forming methods and applications of the inks. The 2D insulating material based printable ink includes at least one solvent; and an exfoliated composition dispersed in the at least one solvent. The exfoliated composition includes a 2D insulating material and a dispersant and stabilizing agent. The printed structures of the 2D insulating material based printable ink possess high ionic conductivity, chemical and thermal stability, and electrically insulating character, which are an ideal set of characteristics for printable battery components such as separators and solid electrolytes.

10 Claims, 17 Drawing Sheets

(56) References Cited

OTHER PUBLICATIONS

H. Zhang, ACS Nano 2015, 9, 9451.
J. Kang, V. K. Sangwan, J. D. Wood, M. C. Hersam, Acc. Chem. Res. 2017, 50, 943.
A. K. Geim, K. S. Novoselov, Nat.Mater. 2007, 6, 183.
C. N. R. Rao, A. K. Sood, K. S. Subrahmanyam, A. Govindaraj, Angew. Chem. Int. Ed. 2009, 48, 7752.
C. Tan, X. Cao, X .- J. Wu, Q. He, J. Yang, X. Zhang, J. Chen, W. Zhao, S. Han, G.-H. Nam, M. Sindoro, H. Zhang, Chem. Res. 2017, 117, 6225.
C. R. Dean, A. F. Young, I. Meric, C. Lee, L. Wang, S. Sorgenfrei, K. Watanabe, T. Taniguchi, P. Kim, K. L. Shepard, Nat.Nanotech. 2010, 5, 722.
M. Wang, S. K. Jang, W.-J. Jang, M. Kim, S.-Y. Park, S.-W. Kim, S.-J. Kahng, J.-Y. Choi, R. S. Ruoff, Y. J. Song, S. Lee,Adv. Mater. 2013, 25, 2746.
T. Roy, M. Tosun, J. S. Kang, A. B. Sachid, S. B. Desai, M. Hettick, C. C. Hu, A. Javey, ACS Nano 2014, 8, 6259.
J. Zhu, J. Kang, J. M. Kang, D. Jariwala, J. D. Wood, J. W. T. Seo, K. S. Chen, T. J. Marks, M. C. Hersam, Nano Lett. 2015, 15, 7029.
Deepika, L. H. Li, A. M. Glushenkov, S. K. Hait, P. Hodgson, Y. Chen, Sci. Rep. 2014, 4, 7288.
C. Zhi, Y. Bando, C. Tang, H. Kuwahara, D. Golberg,Adv. Mater. 2009, 21, 2889.
W.-L. Song, P. Wang, L. Cao, A. Anderson, M. J. Meziani, A. J. Farr, Y.-P. Sun, Angew. Chem. 2012, 124, 6604.
C. Yuan, B. Duan, L. Li, B. Xie, M. Huang, X. Luo, ACS Appl. Mater. Interfaces 2015, 7, 13000.
J. Taha-Tijerina, T. N. Narayanan, G. Gao, M. Rohde, D. A. Tsentalovich, M. Pasquali, P. M. Ajayan, ACS Nano 2012, 6, 1214.
F. Xiao, S. Naficy, G. Casillas, M. H. Khan, T. Katkus, L. Jiang, H. Liu, H. Li, Z. Huang, Adv. Mater. 2015, 27, 7196.
L. Y. Niu, J. N. Coleman, H. Zhang, H. Shin, M. Chhowalla, Z. J. Zheng, Small 2016, 12, 272.
V. Nicolosi, M. Chhowalla, M. G. Kanatzidis, M. S. Strano, J. N. Coleman, Science 2013, 340, 1226419.
J. N. Coleman, M. Lotya, A. O'Neill, S. D. Bergin, P. J. King, U. Khan, K. Young, A. Gaucher, S. De, R. J. Smith, Science 2011, 331, 568.
F. Bonaccorso, A. Lombardo, T. Hasan, Z. Sun, L. Colombo, A. C. Ferrari, Mater.Today 2012, 15, 564.
J. Zhu, M. C. Hersam, Adv. Mater. 2017, 29, 1603895.
F. Bonaccorso, A. Bartolotta, J. N. Coleman, C. Backes, Adv. Mater. 2016, 28, 6136.
E. B. Secor, M. C. Hersam, J. Phys. Chem. Lett. 2015, 6, 620.
Y. Aleeva, B. Pignataro, J. Mater.Chem. C 2014, 2, 6436.
T. Carey, S. Cacovich, G. Divitini, J. Ren, A. Mansouri, J. M. Kim, C. Wang, C. Ducati, R. Sordan, F. Torrisi, Nat. Commun. 2017, 8, 1202.
A. M. Joseph, B. Nagendra, E. Bhoje Gowd, K. P. Surendran, ACS Omega 2016, 1, 1220.
A. M. Gaikwad, D. A. Steingart, T. N. Ng, D. E. Schwartz, G. L. Whiting, Appl. Phys. Lett. 2013, 102, 233302.
A. M. Gaikwad, A. C. Arias, D. A. Steingart, Energy Technol. 2015, 3, 305.
A. J. Blake, R. R. Kohlmeyer, J. O. Hardin, E. A. Carmona, B. Maruyama, J. D. Berrigan, H. Huang, M. F. Durstock, Adv. Energy Mater. 2017, 7, 1602920.
V. Deimede, C. Elmasides, Energy Technol. 2015, 3, 453.
Y. T. Liang, M. C. Hersam, J. Am. Chem. Soc. 2010, 132, 17661.
E. B. Secor, T. Z. Gao, A. E. Islam, R. Rao, S. G. Wallace, J. Zhu, K. W. Putz, B. Maruyama, M. C. Hersam, Chem. Mater. 2017, 29, 2332.
E. B. Secor, B. Y. Ahn, T. Z. Gao, J. A. Lewis, M. C. Hersam, Adv. Mater. 2015, 27, 6683.
P. Calvert, Chem. Mater. 2001, 13, 3299.
B. E. Kahn, Proc. IEEE 2015, 103, 497.
Y.-H. Chang, S.-R. Tseng, C.-Y. Chen, H.-F. Meng, E.-C. Chen, S.-F. Horng, C.-S. Hsu, Org. Electron. 2009, 10, 741.
E. B. Secor, P. L. Prabhumirashi, K. Puntambekar, M. L. Geier, M. C. Hersam, J. Phys. Chem. Lett. 2013, 4, 1347.
X. Huang, J. Solid State Electr. 2011, 15, 649.
P. Raghavan, X. Zhao, J.-K. Kim, J. Manuel, G. S. Chauhan, J.-H. Ahn, C. Nah, Electrochim.Acta 2008, 54, 228.
N. Kostoglou, K. Polychronopoulou, C. Rebholz, Vacuum 2015, 112, 42.
J. Ding, Y. Kong, P. Li, J. Yang, J. Electrochem. Soc. 2012, 159, A1474.

\* cited by examiner

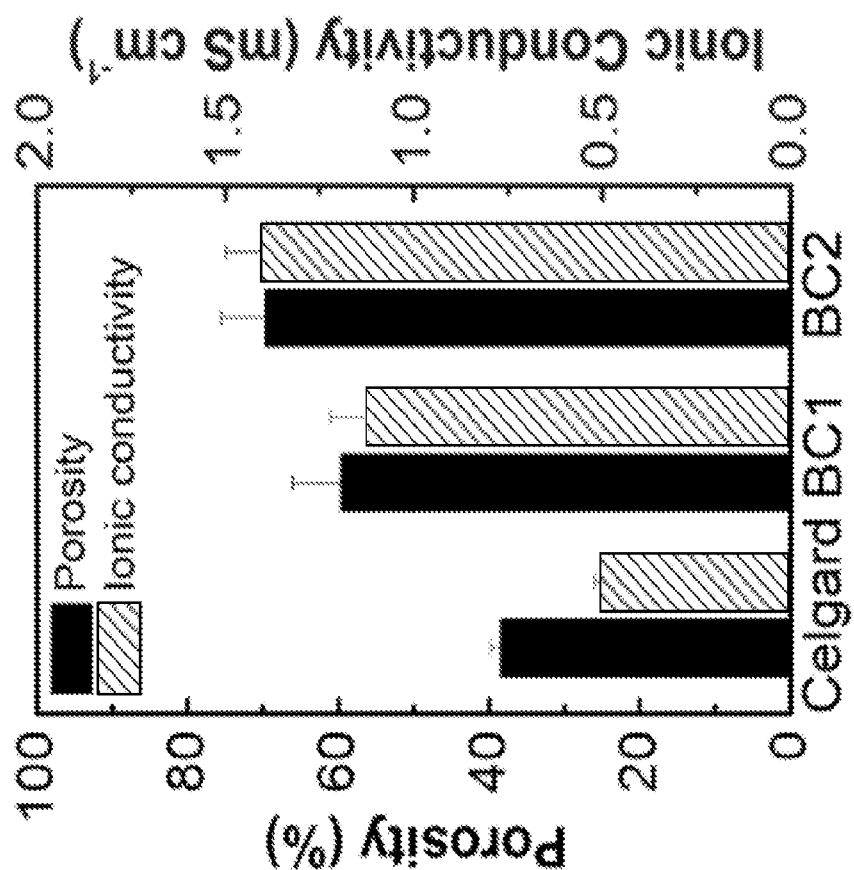
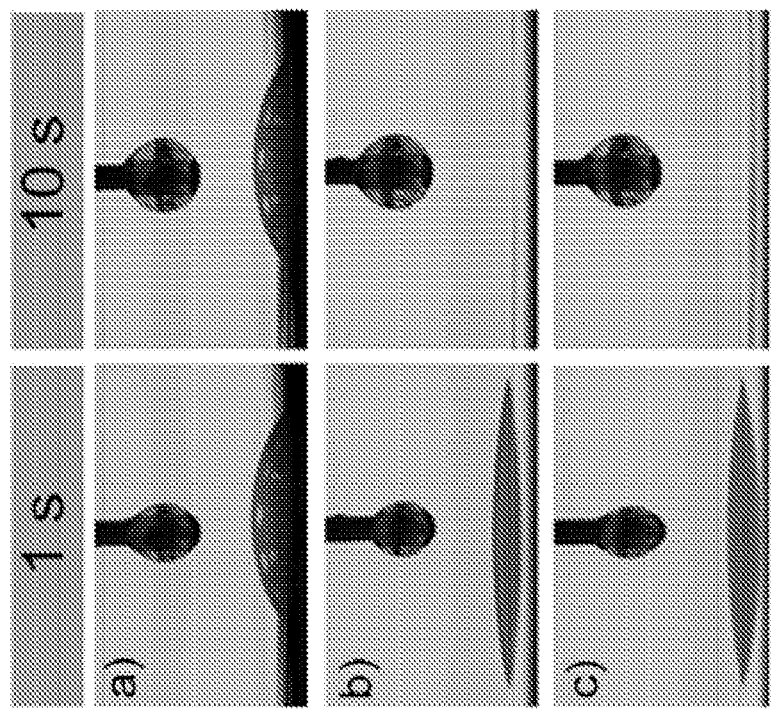
FIG. 5A
FIG. 5B
FIG. 5C
FIG. 5D

TWO-DIMENSIONAL INSULATOR BASED PRINTABLE ION-CONDUCTIVE AND VISCOSITY-TUNABLE INKS, FABRICATING METHODS AND APPLICATIONS OF SAME

CROSS-REFERENCE TO RELATED PATENT APPLICATIONS

This application claims priority to and the benefit of U.S. Provisional Application No. 62/818,846, filed Mar. 15, 2019, which is incorporated herein in its entirety by reference.

This application is also a continuation-in-part application of PCT Application No. PCT/US2019/053362, filed Sep. 27, 2019, which claims priority to and the benefit of U.S. Provisional Application No. 62/740,574, filed Oct. 3, 2018, which are incorporated herein in their entireties by reference.

STATEMENT AS TO RIGHTS UNDER FEDERALLY-SPONSORED RESEARCH

This invention was made with government support under CMMI-1727846 and DMR-1720139 awarded by the National Science Foundation, and under DE-AC02-06CH11357 awarded by the Department of Energy. The government has certain rights in the invention.

FIELD OF THE INVENTION

The present invention relates generally to materials, and more particularly to printable ion-conductive and viscosity-tunable inks based on two-dimensional insulators, methods of making the same, and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Two-dimensional (2D) materials have attracted significant attention in recent years due to their diverse electronic, optical, thermal, and mechanical properties, which make them versatile building blocks for a range of applications. The superlative properties of 2D materials arise from their covalently bonded in-plane structure and out-of-plane quantum confinement in addition to their high surface area to volume ratios that render them highly sensitive to surface stimuli. For example, the in-plane structure of graphene is a covalently bonded honeycomb lattice of carbon atoms with $sp^2$ hybridization, resulting in long-range $\pi$-conjugation and high electron mobility. On the other hand, despite being a structural isomorph of graphene including boron and nitrogen atoms in an analogous honeycomb structure, hexagonal boron nitride (hBN) is electrically insulating, which makes it an appealing dielectric for electronic applications. In addition, hBN has excellent mechanical robustness and high thermal conductivity, which has been utilized to enhance heat transport in composite materials and nanofluids.

In an effort to produce large quantities of 2D nanosheets, liquid-phase exfoliation has emerged as a leading method to exfoliate bulk layered crystals in solution. In this approach, the energy required for exfoliation is introduced by ultra-sonication or shear-mixing in organic solvents, aqueous surfactant media, ionic liquids, salts, or polymer solutions. With appropriate solvents and additives, reaggregation of the exfoliated nanosheets is minimized, leading to stable dispersions that can then be deposited onto substrates for thin-film applications. When the rheology of these nanosheet dispersions is further controlled, they can be engineered into inks that are compatible with additive manu-facturing technologies such as inkjet printing, screen printing, spray coating, and blade coating. Since 2D nanosheets present intrinsic mechanical flexibility, printed nanosheet thin films are compatible with a variety of flexible and stretchable substrates. Despite these advantages, printable hBN nanosheet inks are still an emerging area of study with relatively few reports in the literature. One of the rare examples is the development of a high-viscosity screen-printable hBN nanosheet ink that can be utilized as a printed dielectric. Similarly, a fully inkjet-printed 2D material field-effect transistor was recently demonstrated, where the hBN ink was used to construct the gate dielectric layer. However, printed hBN nanosheets possess limited competitive advantage compared to other printable dielectrics for electronics, suggesting the need for alternative hBN nanosheet ink formulations that are designed for other application areas.

In the arena of energy storage applications, lithium-ion batteries have increasing demands for printed components. For instance, the battery separator is the component that physically prevents electrical contact between the anode and cathode while facilitating ion transport. This functionality requires printed structures that are concurrently electrically insulating and ionically conductive. In principle, hBN meets the first requirement, but the second requirement necessi-tates a nanoporous hBN network that effectively absorbs battery electrolytes, thereby providing facile ion transport. Therefore, control over porosity and electrolyte wettability is required for printed hBN thin films to be effective in this context.

In addition, printable inks based on 2D materials have been formulated using organic solvents such as dimethyl-formamide, n-methyl-2-pyrrolidone, and chloroform or water-based stabilizer such as Triton X-100. However, these methods involve toxic solvents, or lack effective control over the wide range of viscosity required for diverse printing methods.

Therefore, a heretofore unaddressed need exists in the art to address the aforementioned deficiencies and inadequa-cies.

SUMMARY OF THE INVENTION

The objectives of this invention are to provide printable ion-conductive and viscosity-tunable inks based on two-dimensional (2D) insulators, forming methods and applica-tions of the inks. As a result, the printed structures of the inks possess high ionic conductivity, chemical and thermal sta-bility, and electrically insulating character, which are an ideal set of characteristics for printable battery components such as separators and solid electrolytes.

In one aspect, the invention relates to a 2D insulating material based printable ink including at least one solvent; and an exfoliated composition dispersed in the at least one solvent. The exfoliated composition includes a 2D insulating material and a dispersant and stabilizing agent.

In one embodiment, the 2D insulating material has an analogous honeycomb structure.

In one embodiment, the 2D insulating material includes boron nitride nanosheets, borocarbonitrides (BCN), oxide nanosheets, layered perovskites, hydroxide nanosheets including hydrotalcite-like layered double hydroxides, natural clays including bentonites and/or montmorillonites, or a combination of them. In one embodiment, the boron nitride nanosheets include nanosheets of hexagonal boron nitride (hBN). In one embodiment, the oxide nanosheets include $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $Al_2O_3$, $HfSiO_4$, $ZrO_2$, $HfO_2$, $Ta_2O_5$, $La_2O_3$, $LaAlO_3$, $Nb_2O_5$, $BaTiO_3$, $SrTiO_3$, and $Ta_2O_5$, or a combination of them.

In one embodiment, the dispersant and stabilizing agent is adapted to promote liquid-phase exfoliation and stabilization of the 2D insulating material in the at least one solvent.

In one embodiment, the dispersant and stabilizing agent is adapted for broad tunability of ink viscosity to enable compatibility with diverse printing methods ranging from low-viscosity inkjet printing to high-viscosity blade coating.

In one embodiment, the dispersant and stabilizing agent is adapted such that thermal volatilization of the dispersant and stabilizing agent results in a nanoscale carbonaceous coating on the 2D insulating material that promotes organic electrolyte wettability of final printed structure.

In one embodiment, the dispersant and stabilizing agent is adapted such that a final printed structure has a porous microstructure.

In one embodiment, the dispersant and stabilizing agent includes a cellulosic polymer. In one embodiment, the cellulosic polymer includes ethyl cellulose, methyl cellulose, hydroxyethyl cellulose, carboxymethyl cellulose, and hydroxypropylmethyl cellulose, or nitrocellulose.

In one embodiment, the at least one solvent is adapted for diverse printing methods.

In one embodiment, the at least one solvent includes cyclohexanone, terpineol, cyclopentanone, cycloheptanone, cyclohexanol, chloroform, n-alkanes, terpenes, terpene alcohols, or a combination of them.

In one embodiment, the at least one solvent includes ethanol, ethyl lactate, alkyl alcohols, ethyl 2-hydroxypropanoate, 2-hydroxypropanoic acid, 2-hydroxypropanoic acid, propionate, lactate esters, ethyl esters, lactic acids, or a combination of them.

In one embodiment, the 2D insulating material based printable ink is an ion-conductive and viscosity-tunable ink.

In another aspect, the invention relates to device comprising one or more components printed of the 2D insulating material based printable ink as disclosed above. The device can be one or more batteries, one or more sensors, one or more supercapacitors, one or more transistors, one or more energy storage devices, one or more flexible electronic devices, one or more printed electronic devices, or a combination of them.

In one embodiment, the one or more components has a porous microstructure.

In one embodiment, the one or more components include a nanoscale carbonaceous coating on the 2D insulating material resulted from thermal volatilization of the dispersant and stabilizing agent.

In yet another aspect, the invention relates to a method for forming a 2D insulating material based printable ink. In one embodiment, the method includes obtaining an exfoliated composition comprising a 2D insulating material and a dispersant and stabilizing agent; and dispersing the exfoliated composition in at least one solvent.

In one embodiment, the obtaining step includes dispersing a bulk of the 2D insulating material in a solution of dispersant and stabilizing agent dissolved in a solvent of ethanol to form a first mixture thereof; exfoliating the 2D insulating material by shear-mixing the first mixture for a period of time at a predetermined speed to result in a dispersion; centrifuging the resulting dispersion to sediment out large particles, and collecting supernatant containing the solvent, the dispersant and stabilizing agent, and the 2D insulating material; removing excess dispersant and stabilizing agent and solvent by a flocculation process to obtain a sediment of the exfoliated 2D insulating material with the dispersant and stabilizing agent; and washing the sediment with deionized water to remove residual salt and drying the washed sediment to yield powder of the exfoliated composition.

In one embodiment, the flocculation process includes mixing the supernatant with an aqueous sodium chloride solution to form a second mixture; and centrifuging the second mixture to sediment the exfoliated 2D insulating material with the dispersant and stabilizing agent.

In a further aspect, the invention relates to a method for forming a structure that possesses high ionic conductivity, chemical and thermal stability, and electrically insulating character. In one embodiment, the method includes performing a printing method to deposit the 2D insulating material based printable ink as disclosed above on a substrate to form a printed structure thereon; and thermally annealing the printed structures to promote volatilization of the dispersant and stabilizing agent, resulting in a porous microstructure and formation of a nanoscale carbonaceous coating on the 2D insulating material that promotes organic electrolyte wettability of the printed structure.

In one embodiment, the 2D insulating material has an analogous honeycomb structure.

In one embodiment, the 2D insulating material includes boron nitride nanosheets, borocarbonitrides (BCN), oxide nanosheets, layered perovskites, hydroxide nanosheets including hydrotalcite-like layered double hydroxides, natural clays including bentonites and/or montmorillonites, or a combination of them. In one embodiment, the boron nitride nanosheets include nanosheets of hexagonal boron nitride (hBN). In one embodiment, the oxide nanosheets include $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $Al_2O_3$, $HfSiO_4$, $ZrO_2$, $HfO_2$, $Ta_2O_5$, $La_2O_3$, $LaAlO_3$, $Nb_2O_5$, $BaTiO_3$, $SrTiO_3$, and $Ta_2O_5$, or a combination of them.

In one embodiment, the dispersant and stabilizing agent is adapted to promote liquid-phase exfoliation and stabilization of the 2D insulating material in the at least one solvent.

In one embodiment, the dispersant and stabilizing agent is adapted for broad tunability of ink viscosity to enable compatibility with diverse printing methods ranging from low-viscosity inkjet printing to high-viscosity blade coating.

In one embodiment, the dispersant and stabilizing agent is adapted such that thermal volatilization of the dispersant and stabilizing agent results in a nanoscale carbonaceous coating on the 2D insulating material that promotes organic electrolyte wettability of final printed structure.

In one embodiment, the dispersant and stabilizing agent is adapted such that a final printed structure has a porous microstructure.

In one embodiment, the dispersant and stabilizing agent includes a cellulosic polymer. In one embodiment, the cellulosic polymer includes ethyl cellulose, methyl cellulose, hydroxyethyl cellulose, carboxymethyl cellulose, and hydroxypropylmethyl cellulose, or nitrocellulose.

In one embodiment, the at least one solvent is adapted for diverse printing methods.

In one embodiment, the at least one solvent includes cyclohexanone, terpineol, cyclopentanone, cycloheptanone, cyclohexanol, chloroform, n-alkanes, terpenes, terpene alcohols, or a combination of them.

In one embodiment, the at least one solvent includes ethanol, ethyl lactate, alkyl alcohols, ethyl 2-hydroxypropanoate, 2-hydroxypropanoic acid, 2-hydroxypropanoic acid, propionate, lactate esters, ethyl esters, lactic acids, or a combination of them.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1A: Scanning electron microscopy (SEM) image of the exfoliated hBN/EC powder. FIG. 1B: Individual hBN nanosheets observed by atomic force microscopy (AFM). FIGS. 1C-1D: Transmission electron microscopy (TEM) images of exfoliated hBN nanosheets showing the ethyl cellulose coating on the surface of the nanosheets at (FIG. 1C) lower and (FIG. 1D) higher magnification.

FIG. 2A: The inkjet printable (IJP) hBN ink is prepared by dispersion of the hBN/EC exfoliated powder in an about 85:15 ratio of cyclohexanone and terpineol. FIG. 2B: Blade-coatable (BC) hBN inks are prepared by dispersing hBN/EC powder in an about 2:1 ratio of ethanol and ethyl lactate. The solvents are then evaporated to tune the viscosity, resulting in a low-viscosity BC1 hBN ink (about 0.4 Pa·s at about $10^3$ s$^{-1}$) and a high-viscosity BC2 hBN ink (about 2.6 Pa·s at about $10^3$ s$^{-1}$). FIG. 2C: Viscosity as a function of shear rate for all three hBN ink formulations.

FIG. 3A: Optical microscopy image of inkjet-printed hBN lines on a glass substrate. FIGS. 3B-3C: SEM micrographs reveal the uniformity of the printed features, illustrating the percolating morphology of the hBN nanoflakes before (FIG. 3B) and after (FIG. 3C) thermal annealing. FIG. 3D: Optical microscopy image after multiple printing passes on a glass substrate. FIG. 3E: Average height of the hBN lines as-printed and following thermal annealing. FIG. 3F: Averaged cross-sectional profiles of the printed lines after 1 and 5 printing passes, demonstrating the increase in thickness after multiple printing passes and the decrease in thickness after thermal annealing.

FIGS. 5A-5E show comparisons of hBN films to commercial Celgard lithium-ion battery separators, according to embodiments of the invention. FIGS. 5A-5C: Contact angle measurements to assess organic electrolyte wettability of (FIG. 5A) Celgard, (FIG. 5B) blade-coated BC1 hBN film, and (FIG. 5C) blade-coated BC2 hBN film. In particular, an about 5 µL liquid electrolyte drop (about 1 M LiPF$_6$ in about 1:1 ethylene carbonate:diethyl carbonate) was deposited on the surface of each film and photographs were taken after about 1 s and about 10 s. FIG. 5D: Room temperature ionic conductivity and porosity measurements of Celgard and hBN films. FIG. 5E: Thermal properties of the Celgard and hBN films. Photographs were taken after the heating samples on a hot plate for about 10 min at about 150° C. The hBN films show no change, whereas the Celgard film undergoes dramatic morphological changes and shrinkage.

FIG. 6A: hBN nanosheets are exfoliated from bulk hBN powder in ethanol/EC by shear mixing. FIG. 6B: Centrifugation-based sedimentation is used to remove residual large hBN flakes. FIG. 6C: Flocculation of hBN/EC is induced by saline solution to remove excess EC polymer. FIG. 6D: hBN/EC is rinsed with deionized water to remove salt, which is then followed by a drying step to produce the exfoliated hBN/EC powder.

(FIG. 8A) glass and (FIG. 8B) polyimide, according to embodiments of the invention. The printed features are squares measuring 5 mm×5 mm.

(FIG. 9A) polyimide, (FIG. 9B) aluminum, (FIG. 9C) copper, and (FIG. 9D) glass, according to embodiments of the invention.

DETAILED DESCRIPTION OF THE INVENTION

Figure 1A:
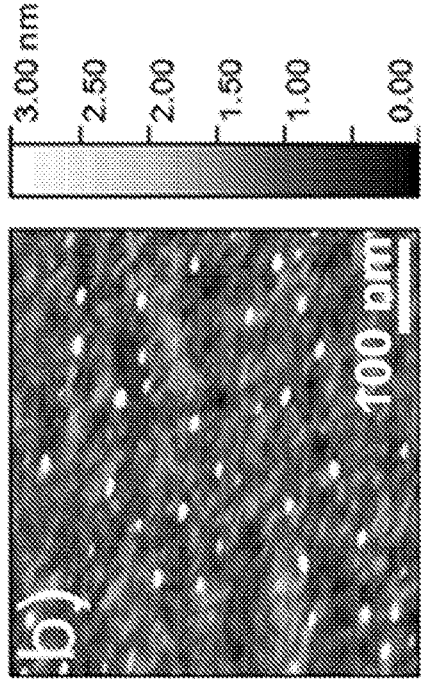
FIGS. 1A-1D show morphologies of hBN nanosheets exfoliated from bulk hBN in ethanol/EC by shear mixing, according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Liquid-phase exfoliation of layered solids holds promise for the scalable production of two-dimensional (2D) nanosheets. When combined with suitable solvents and stabilizing polymers, the rheology of the resulting nanosheet dispersions can be tuned for a variety of additive manufacturing methods. While significant progress has been made in the development of electrically conductive nanosheet inks, minimal effort has been applied to ion-conductive nanosheet inks despite their central role in energy storage applications.

One aspect of the invention relates to a 2D insulating material based printable ink including at least one solvent; and an exfoliated composition dispersed in the at least one solvent. The exfoliated composition comprises a 2D insulating material and a dispersant and stabilizing agent. The 2D insulating material based printable ink is an ion-conductive and viscosity-tunable ink.

Another aspect of the invention relates to device comprising one or more components printed of said 2D insulating material based printable ink. The device can be one or more batteries, one or more sensors, one or more supercapacitors, one or more transistors, one or more energy storage devices, one or more flexible electronic devices, one or more printed electronic devices, or a combination of them. In certain embodiments, the one or more components has a porous microstructure. In certain embodiments, the one or more components comprise a nanoscale carbonaceous coating on the 2D insulating material resulted from thermal volatilization of the dispersant and stabilizing agent.

Yet another aspect of the invention relates to a method for forming a 2D insulating material based printable ink. In one embodiment, the method includes obtaining an exfoliated composition comprising a 2D insulating material and a dispersant and stabilizing agent; and dispersing the exfoliated composition in at least one solvent.

In certain embodiments, the obtaining step comprises dispersing a bulk of the 2D insulating material in a solution of dispersant and stabilizing agent dissolved in a solvent of ethanol to form a first mixture thereof; exfoliating the 2D insulating material by shear-mixing the first mixture for a period of time at a predetermined speed to result in a dispersion; centrifuging the resulting dispersion to sediment out large particles, and collecting supernatant containing the solvent, the dispersant and stabilizing agent, and the 2D insulating material; removing excess dispersant and stabilizing agent and solvent by a flocculation process to obtain a sediment of the exfoliated 2D insulating material with the dispersant and stabilizing agent; and washing the sediment with deionized water to remove residual salt and drying the washed sediment to yield powder of the exfoliated composition. In certain embodiments, the flocculation process comprises mixing the supernatant with an aqueous sodium chloride solution to form a second mixture; and centrifuging the second mixture to sediment the exfoliated 2D insulating material with the dispersant and stabilizing agent.

A further aspect of the invention relates to a method for forming a structure that possesses high ionic conductivity, chemical and thermal stability, and electrically insulating character. The method includes performing a printing method to deposit the 2D insulating material based printable ink as disclosed above on a substrate to form a printed structure thereon; and thermally annealing the printed structures to promote volatilization of the dispersant and stabilizing agent, resulting in a porous microstructure and formation of a nanoscale carbonaceous coating on the 2D insulating material that promotes organic electrolyte wettability of the printed structure.

In certain embodiments, the 2D insulating material has an analogous honeycomb structure.

In certain embodiments, the 2D insulating material comprises boron nitride nanosheets, borocarbonitrides (BCN), oxide nanosheets, layered perovskites, hydroxide nanosheets including hydrotalcite-like layered double hydroxides, natural clays including bentonites and/or montmorillonites, or a combination of them. In certain embodiments, the boron nitride nanosheets comprise nanosheets of hBN. In certain embodiments, the oxide nanosheets comprise $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $Al_2O_3$, $HfSiO_4$, $ZrO_2$, $HfO_2$, $Ta_2O_5$, $La_2O_3$, $LaAlO_3$, $Nb_2O_5$, $BaTiO_3$, $SrTiO_3$, and $Ta_2O_5$, or a combination of them.

In certain embodiments, the dispersant and stabilizing agent is adapted to promote liquid-phase exfoliation and stabilization of the 2D insulating material in the at least one solvent.

In certain embodiments, the dispersant and stabilizing agent is adapted for broad tunability of ink viscosity to enable compatibility with diverse printing methods ranging from low-viscosity inkjet printing to high-viscosity blade coating.

In certain embodiments, the dispersant and stabilizing agent is adapted such that thermal volatilization of the dispersant and stabilizing agent results in a nanoscale carbonaceous coating on the 2D insulating material that promotes organic electrolyte wettability of final printed structure.

In certain embodiments, the dispersant and stabilizing agent is adapted such that a final printed structure has a porous microstructure.

In certain embodiments, the dispersant and stabilizing agent comprises a cellulosic polymer. In one embodiment, the cellulosic polymer comprises ethyl cellulose, methyl cellulose, hydroxyethyl cellulose, carboxymethyl cellulose, and hydroxypropylmethyl cellulose, or nitrocellulose.

In certain embodiments, the at least one solvent is adapted for diverse printing methods.

In certain embodiments, the at least one solvent comprises cyclohexanone, terpineol, cyclopentanone, cycloheptanone, cyclohexanol, chloroform, n-alkanes, terpenes, terpene alcohols, or a combination of them.

In certain embodiments, the at least one solvent comprises ethanol, ethyl lactate, alkyl alcohols, ethyl 2-hydroxypropanoate, 2-hydroxypropanoic acid, 2-hydroxypropanoic acid, propionate, lactate esters, ethyl esters, lactic acids, or a combination of them.

These and other aspects of the invention are further described below according to certain exemplary embodiments. The viscosity-tunable hBN inks are compatible with a wide range of printing methods that span the spectrum from low-viscosity inkjet printing to high-viscosity blade coating. In certain exemplary embodiments, the hBN inks are prepared by liquid-phase exfoliation with the polymer ethyl cellulose (EC) acting as both a dispersant and a stabilizing agent. Thermal annealing of the printed structures promotes volatilization of the polymer, resulting in a porous microstructure and the formation of a nanoscale carbonaceous coating on the hBN nanosheets, which promotes high wettability to battery electrolytes. The final result is a printed hBN nanosheet film that possesses high ionic conductivity, chemical and thermal stability, and electrically insulating character, which are an ideal set of characteristics for printable battery components such as separators and solid electrolytes.

In certain embodiments, by incorporating multifunctional cellulosic polymers into printable hBN inks, control over porosity and electrolyte wettability for printed hBN thin films is achieved. In certain exemplary embodiments, EC is employed to promote liquid-phase exfoliation and stabilization of hBN nanosheets in solution in a manner that is analogous to graphene nanosheets. In addition to minimizing nanosheet reaggregation, EC allows for broad tunability of ink viscosity to enable compatibility with diverse printing methods ranging from low-viscosity inkjet printing to high-viscosity blade coating. The polymer stabilizer also imparts porosity to the final printed structure since EC is largely volatilized upon thermal curing, resulting in a porous hBN microstructure. Lastly, the thermal volatilization of EC leaves behind a nanoscale carbonaceous coating on the hBN nanosheets that promotes wetting by organic solvents such as lithium-ion battery electrolytes, ultimately enabling ionic conductivities that exceed traditional polymer-based battery separators.

According to the exemplary embodiments of the invention, the hBN nanosheets are prepared by liquid-phase shear exfoliation in the presence of EC as a polymer stabilizer. Specifically, in one exemplary example, a solution of about 150 mg/mL bulk hBN powder in about 1.5 w/v % EC/ethanol is shear mixed for about 120 min, followed by a centrifugation step to sediment out large, unexfoliated hBN particles. Flocculation of the hBN/EC solid is induced by addition of a saline solution to the supernatant of the sedimentation step to remove excess EC, which is also isolated by centrifugation. The sediment is then rinsed with deionized water to remove salt residues, followed by a drying step performed in ambient conditions to yield a white powder including about 90 wt % hBN and about 10 wt % EC, as shown in FIGS. 6A-6D and 7.

Figure 1B:
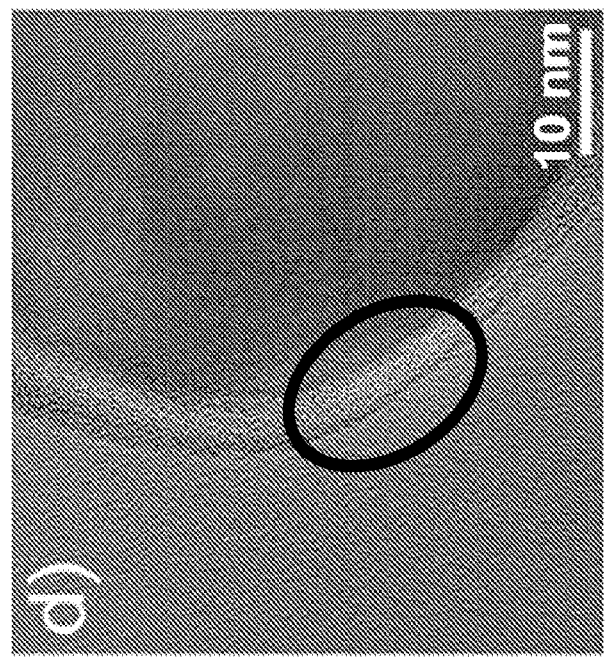
Figure 1C:
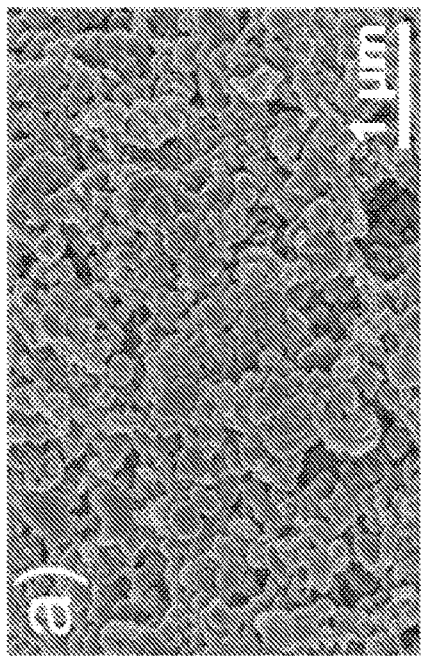
Figure 1D:
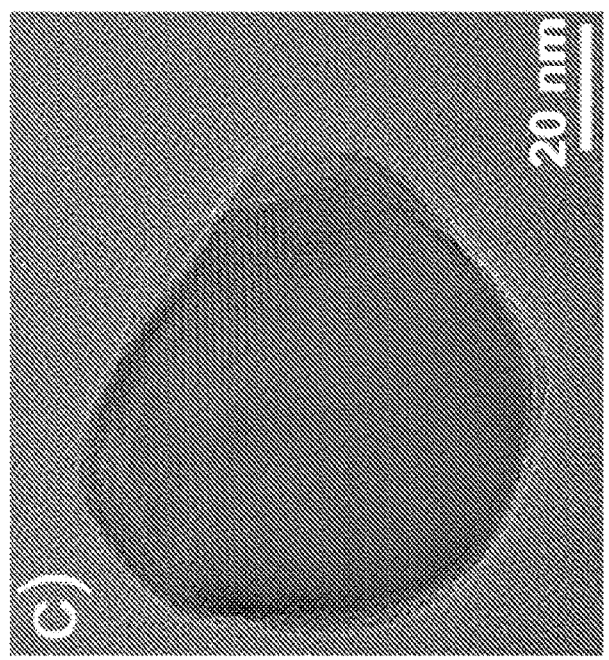

As shown in FIG. 1A, successful exfoliation of hBN nanosheets is confirmed with scanning electron microscopy (SEM), which reveals the absence of large hBN particles. Individual hBN nanosheets are also observed by tapping mode atomic force microscopy (AFM), as shown in FIG. 1B, illustrating an average thickness of about 3 nm and sub-100 nm lateral dimensions that are compatible with inkjet printing without nozzle clogging. Transmission electron microscopy (TEM) confirms the sub-100 nm lateral dimensions of the hBN nanosheets, as shown in FIG. 1C, and reveals the nanoscale carbonaceous coating on the hBN nanosheet surface, as shown in FIG. 1D.

Figure 2C:
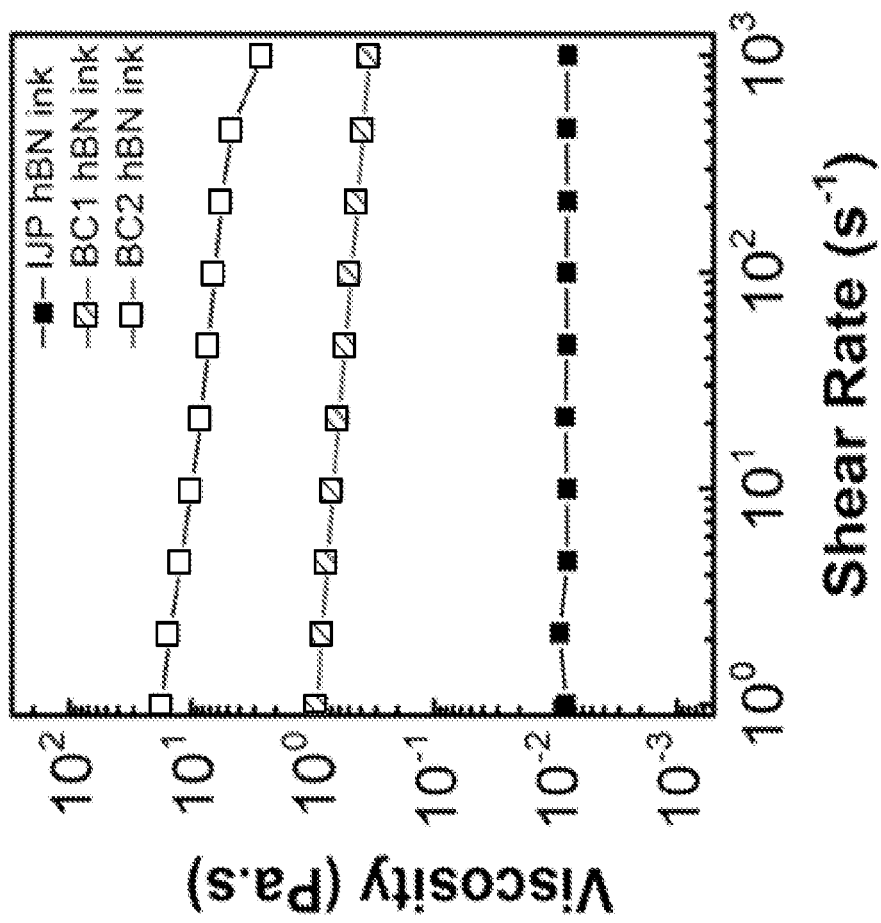
FIGS. 2A-2C show ink preparations and rheological characterization, according to embodiments of the invention.
Figure 2A:
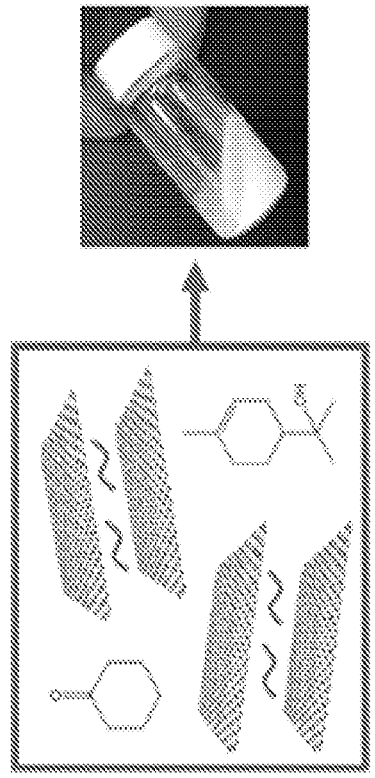

The exfoliated hBN nanosheets are readily dispersed in a wide range of solvents, allowing for the preparation of diverse hBN ink formulations. In particular, inkjet printing requires that inks are readily jetted into well-defined droplets that result in high-resolution printed lines. An inkjet printable (IJP) hBN ink was thus tailored to achieve a viscosity and surface tension consistent with the formation of stable droplets. In one exemplary embodiment, the exfoliated hBN/EC powder was dispersed in a mixture of cyclohexanone and terpineol, yielding an IJP ink with a solid concentration of about 5.1 wt % hBN and viscosity of about $8.0 \times 10^{-3}$ Pa·s at about 1000 s$^{-1}$, as shown in FIGS. 2A and 2C.

Figure 2B:
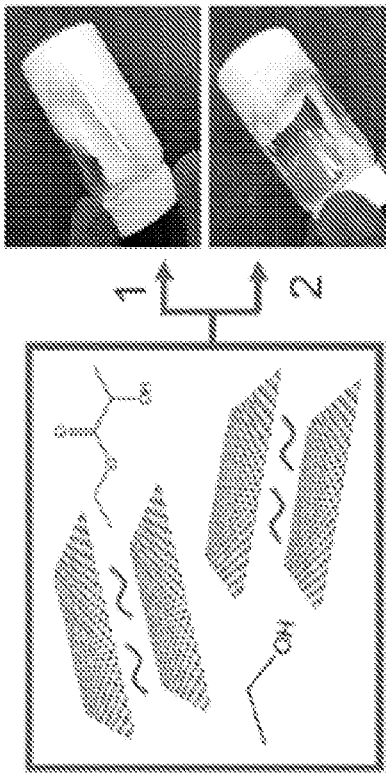

Blade coating is an alternative additive manufacturing method that is more suitable for large-area thin-film coatings than inkjet printing. In one embodiment, the film thickness is controlled by adjusting the gap size of the blade to the substrate, allowing for the casting of films with thicknesses ranging from hundreds of nanometers to several microns. A lower boiling point solvent system is utilized for the blade-coatable (BC) hBN ink, which includes an about 2:1 mixture of ethanol and ethyl lactate. The as-prepared ink (BC1 hBN ink) possesses a solid concentration of about 23 wt % hBN and a viscosity of about 0.4 Pa·s at about 1000 s$^{-1}$, as shown in FIGS. 2B-2C, which is two orders of magnitude higher than the IJP ink. An additional higher viscosity ink (BC2 hBN ink) is prepared by partial evaporation of the solvents, resulting in about 45 wt % solid content hBN and a viscosity of about 2.6 Pa·s at about 1000 s$^{-1}$, as shown in FIGS. 2B-2C. As shown in FIG. 2C, the rheological properties of these inks show a pseudo plastic behavior, particularly for the BC2 ink. The observed shear-thinning behavior is expected for composite fluids whose viscosity decreases with a corresponding increase in shear rate.

Figure 3A:
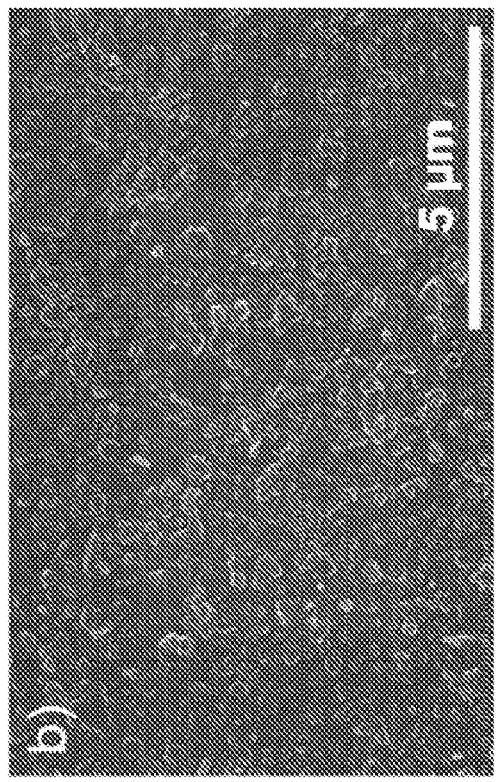
FIGS. 3A-3F show inkjet printing results, according to embodiments of the invention.
Figure 3B:
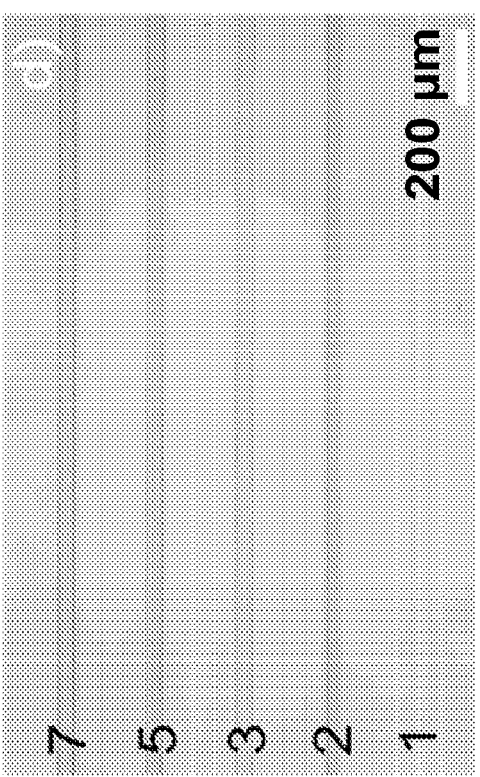
Figure 3C:
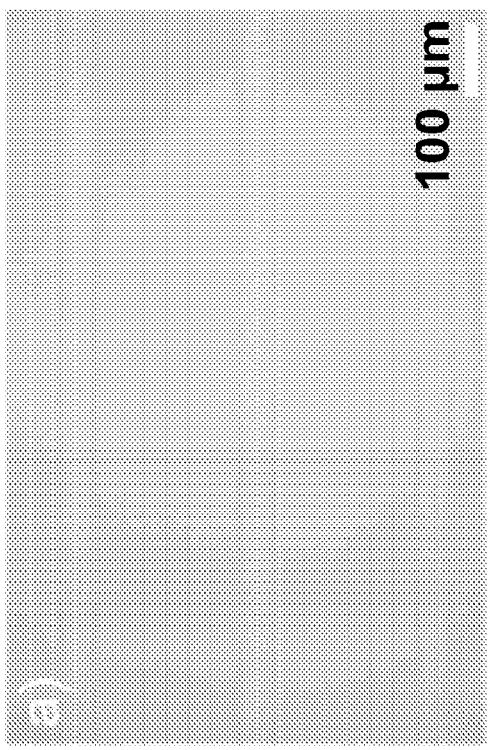
Figure 8A:
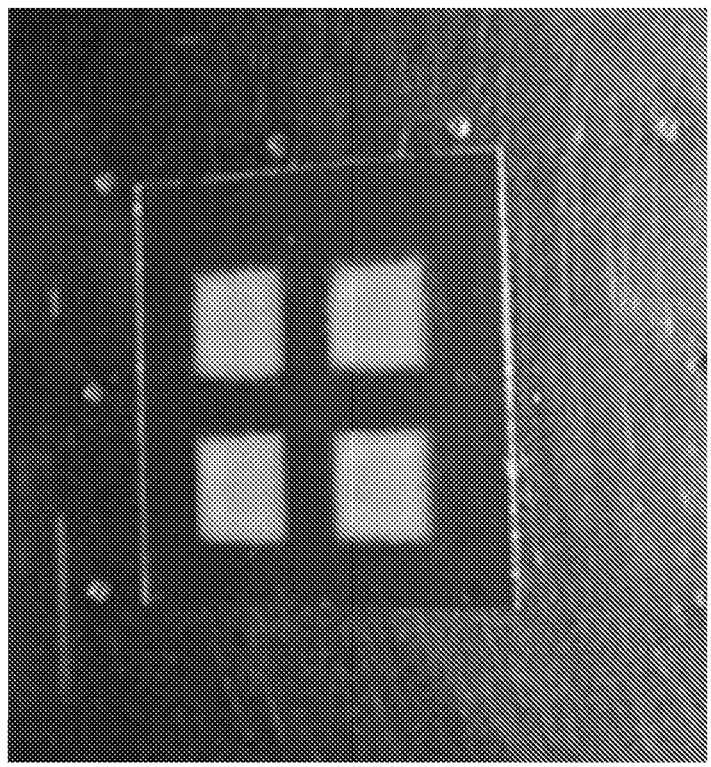
FIGS. 8A-8B show large-area inkjet-printed hBN patterns on different substrates.
Figure 8B:
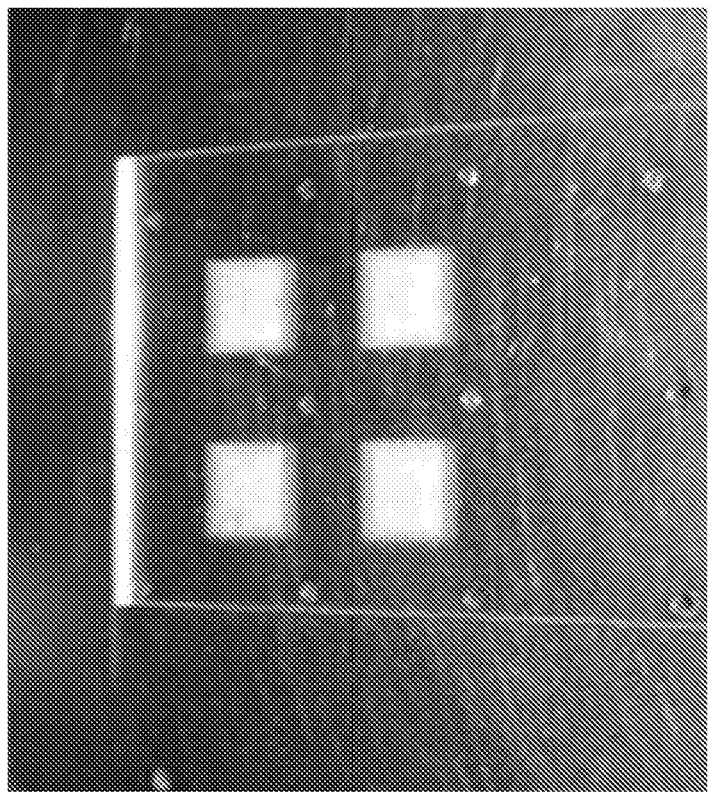
Figure 9A:
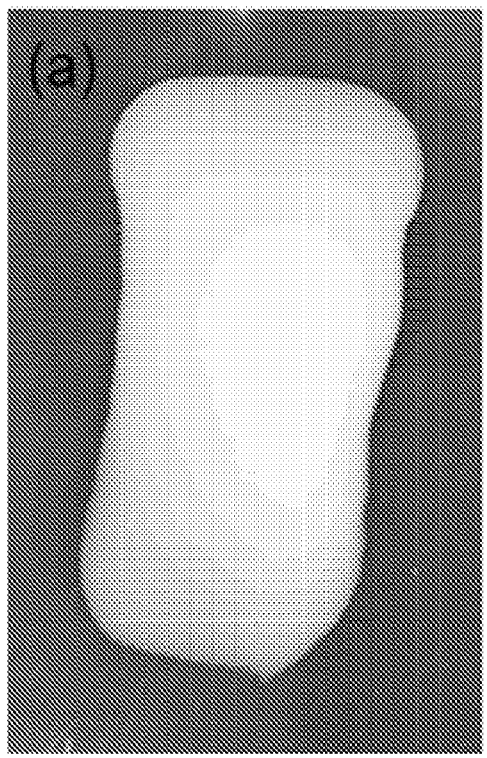
FIGS. 9A-9D show blade-coated hBN inks on different substrates.
Figure 9B:
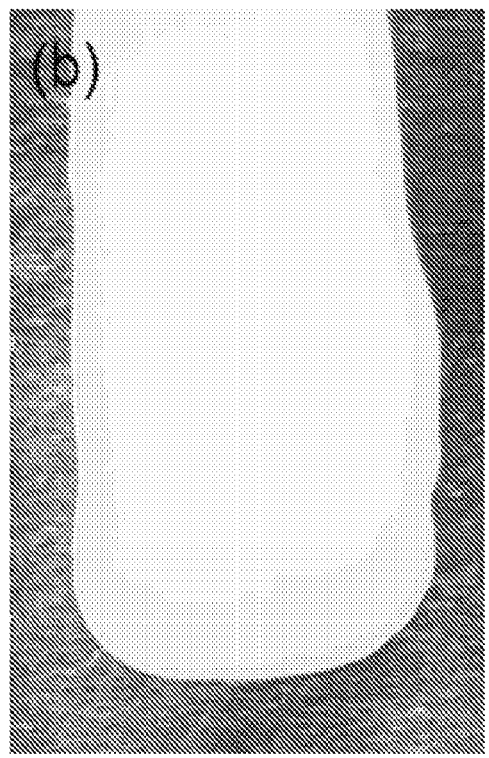
Figure 9C:
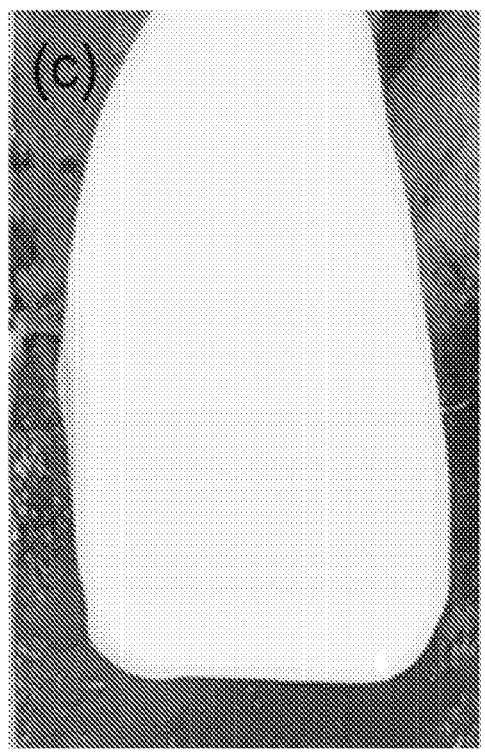
Figure 9D:
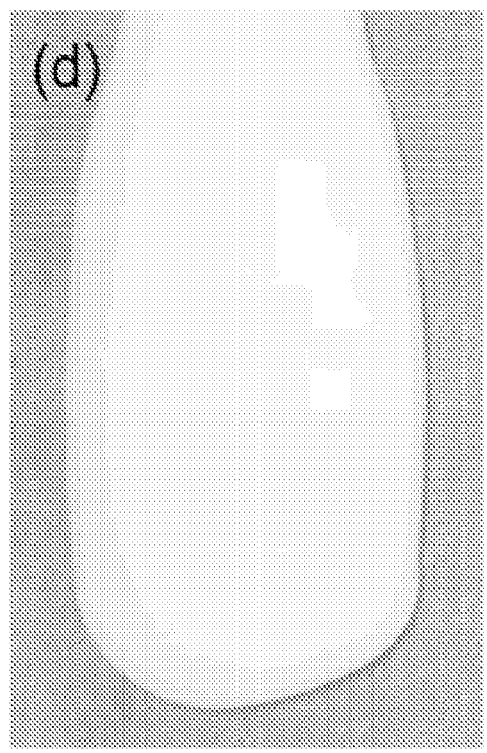
Figures 10A, 10B:
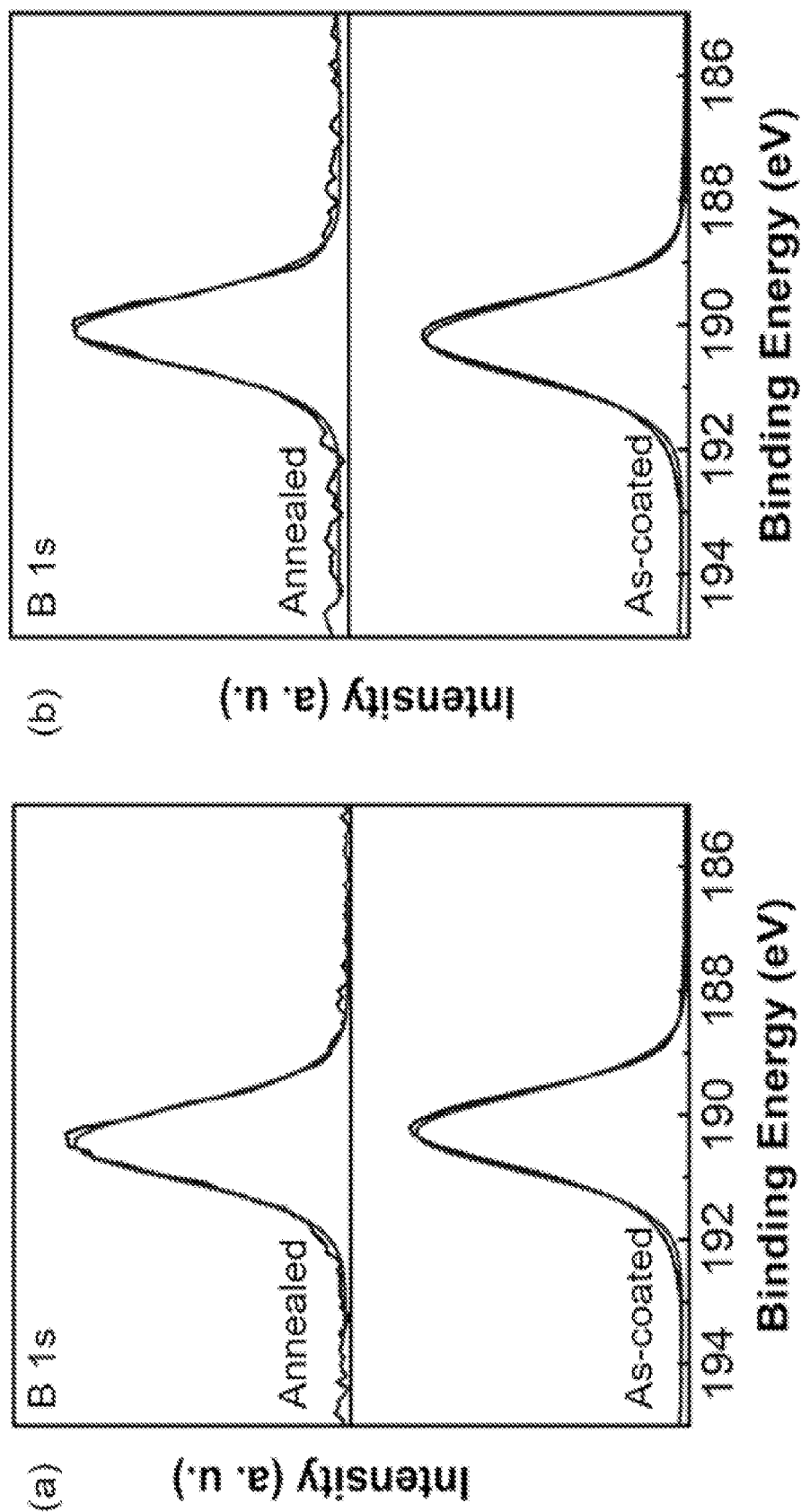
FIGS. 10A-10B show B is XPS core levels of the as-coated and annealed hBN films prepared from (FIG. 10A) BC1 hBN ink and (FIG. 10B) BC2 hBN ink, according to embodiments of the invention.
Figure 11A:
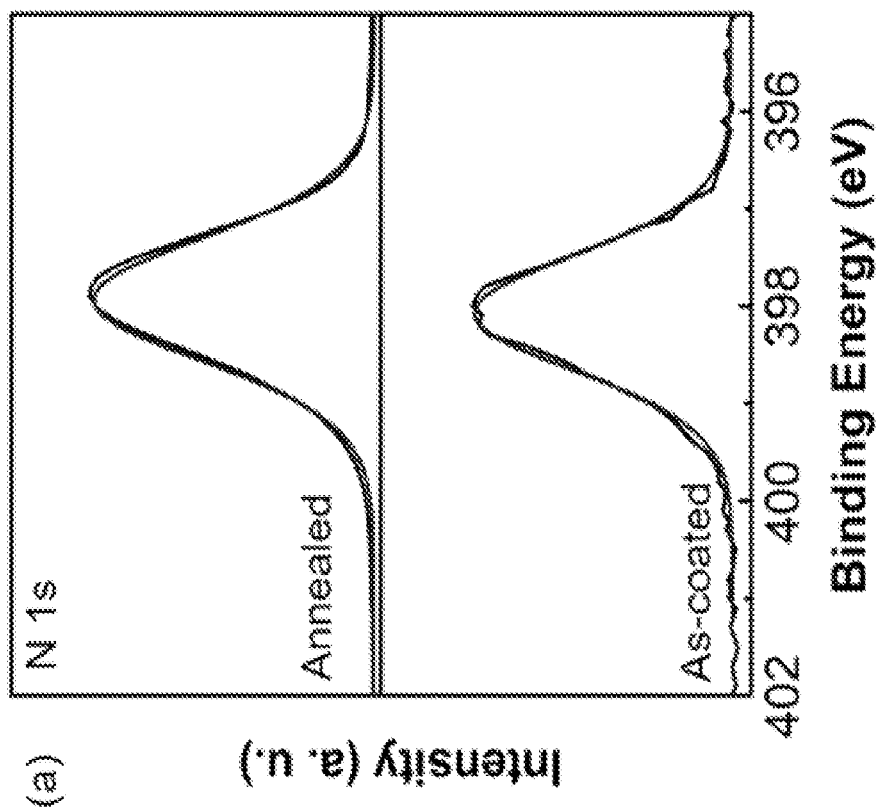
FIGS. 11A-11B show N is XPS core levels of the as-coated and annealed hBN films prepared from (FIG. 11A) BC1 hBN ink and (FIG. 11B) BC2 hBN ink, according to embodiments of the invention.
Figure 11B:
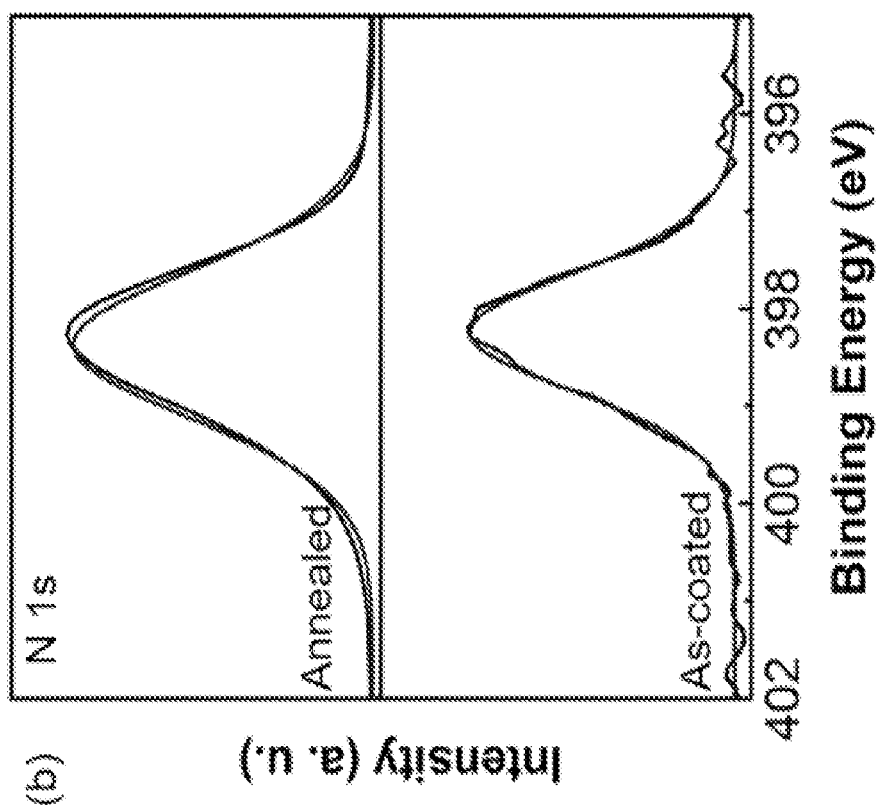

The inkjet printability of the IJP hBN ink is demonstrated in FIGS. 3A-3F. The optical microcopy image shown in FIG. 3A illustrates highly uniform printed lines with well-defined edges. SEM images shown in FIGS. 3B-3C present additional evidence of the uniformity of the printed lines and the morphology of the hBN nanoflakes. The homogenous morphology of the printed lines confirms the quality of the IJP hBN ink formulation, which evidently minimizes coffee ring formation and other artifacts that can emerge during solvent evaporation. In addition, it is notable that a single printing pass achieves sufficient thickness and uniformity for many applications due to the relatively high solid content of hBN. Patterning over large areas is illustrated in FIGS. 8A-8B, confirming the reliability of inkjet printing on diverse substrates such as glass and polyimide.

Figure 3D:
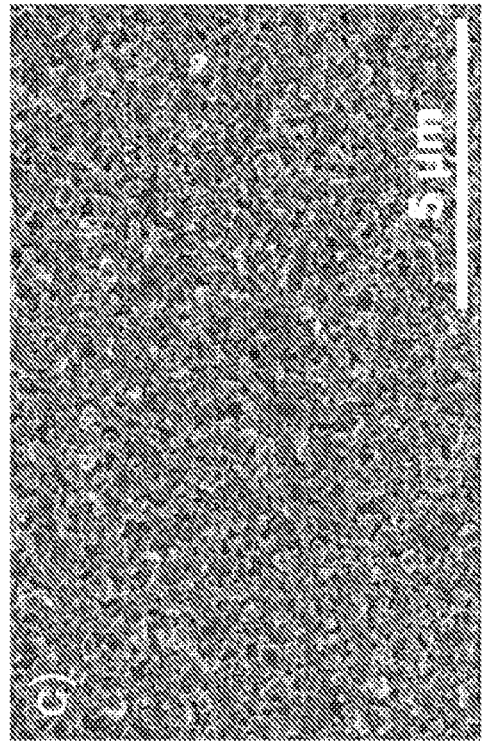
Figure 3F:
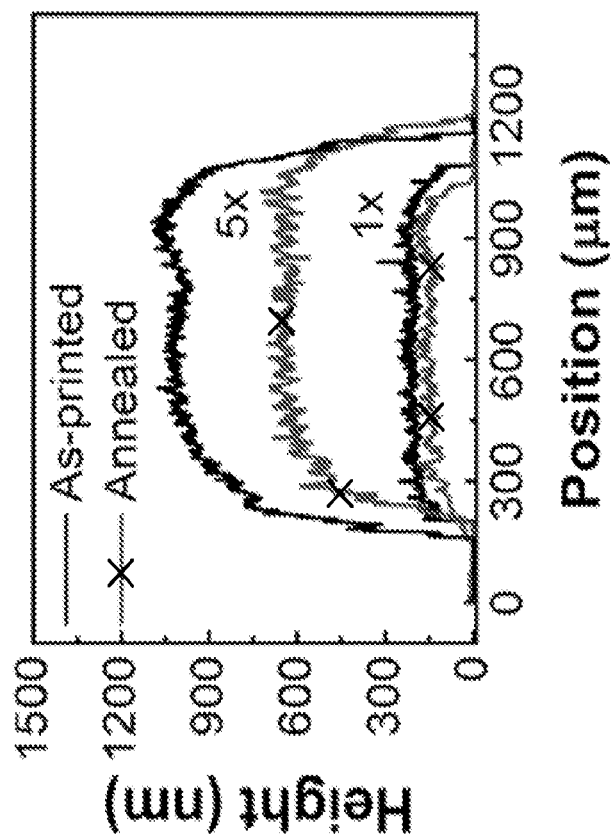
Figure 3E:
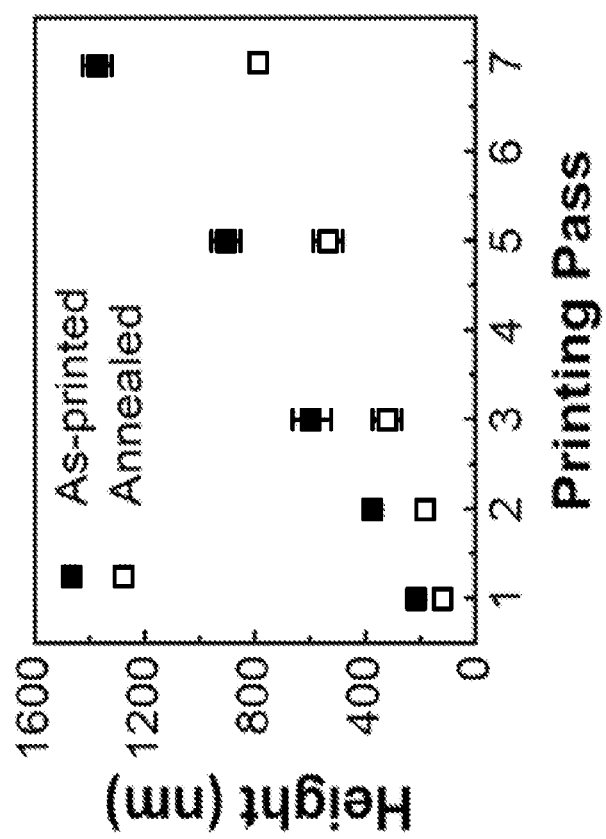

Multiple printing passes result in thicker lines where the average height increases linearly with the number of printing passes, as shown in FIG. 3D. In particular, each additional printing pass adds 204±5 nm in thickness to the hBN patterns prior to annealing. Following thermal decomposition of the polymer dispersant, the average thickness of a single-pass line decreases to 120±12 nm, as shown in FIG. 3E. FIG. 3F provides optical profilometry height profiles after 1 and 5 passes, which corroborate the decrease in thickness after thermal annealing. The resulting printed patterns also show no evidence of delamination or cracking, demonstrating high mechanical integrity that is critical for subsequent processing and applications.

The results for the blade-coatable hBN inks are summarized in FIGS. 4A-4G. Following blade coating onto stainless steel substrates using a blade gap of about 22 μm, the BC1 and BC2 hBN inks resulted in smooth and homogeneous films with thicknesses of 19.5±1.3 μm and 31.3±2.5 μm, respectively. As expected, the film thickness of the blade-coated films depends on the total solid concentration of the ink, where higher solid content leads to thicker films for a given blade gap. After blade coating, the films are dried at room temperature overnight, followed by thermal annealing at about 300° C. for about 30 min to decompose the EC polymer. The resulting surface morphology is examined by SEM as shown in FIGS. 4A-4D. The blade-coated thin films are comprised of well-stacked hBN nanosheet networks with the nanosheets mostly aligned in the plane of the substrate. The observed preferential horizontal orientation of the hBN nanosheets is consistent with previous reports for blade-coated graphene films. In addition, the blade-coated hBN films possess uniform porosity after thermal volatilization of the EC polymer stabilizer.

Figure 4B:
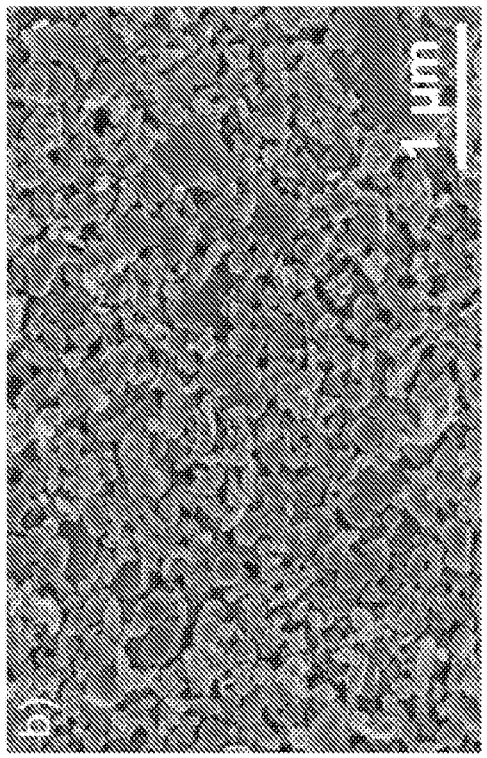
FIGS. 4A-4D show blade coating results, according to embodiments of the invention. Scanning electron micrographs of (FIGS. 4A and 4C) low-viscosity and (FIGS. 4B and 4D) high-viscosity blade-coatable hBN inks. SEM micrographs were captured at the (FIGS. 4A and 4B) top surface and (FIGS. 4C and 4D) cross-sections of the hBN films.
Figure 4D:
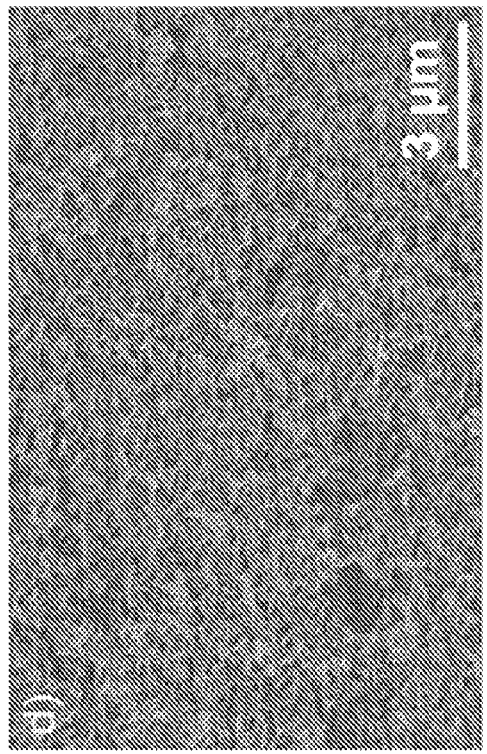
Figure 4A:
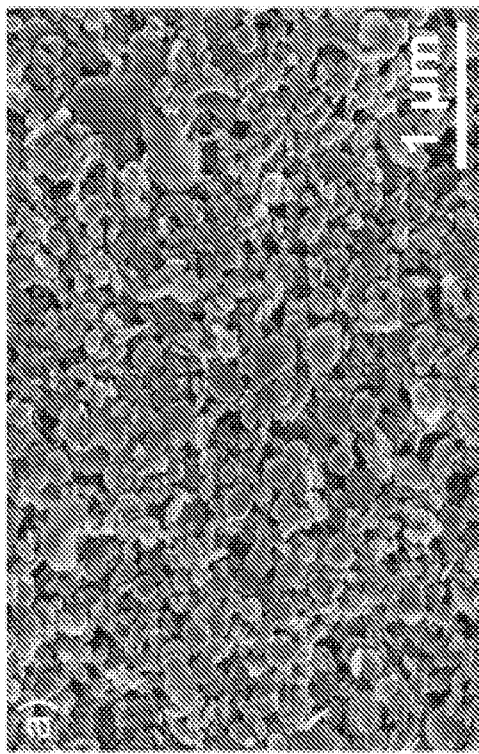
Figure 4C:
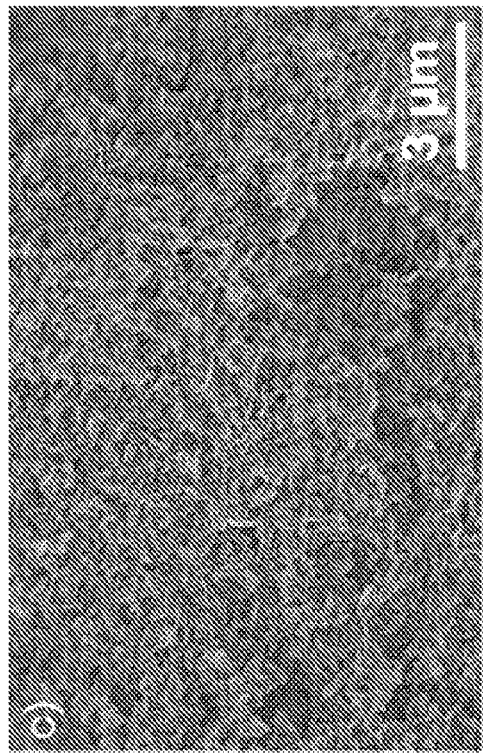
Figure 4E:
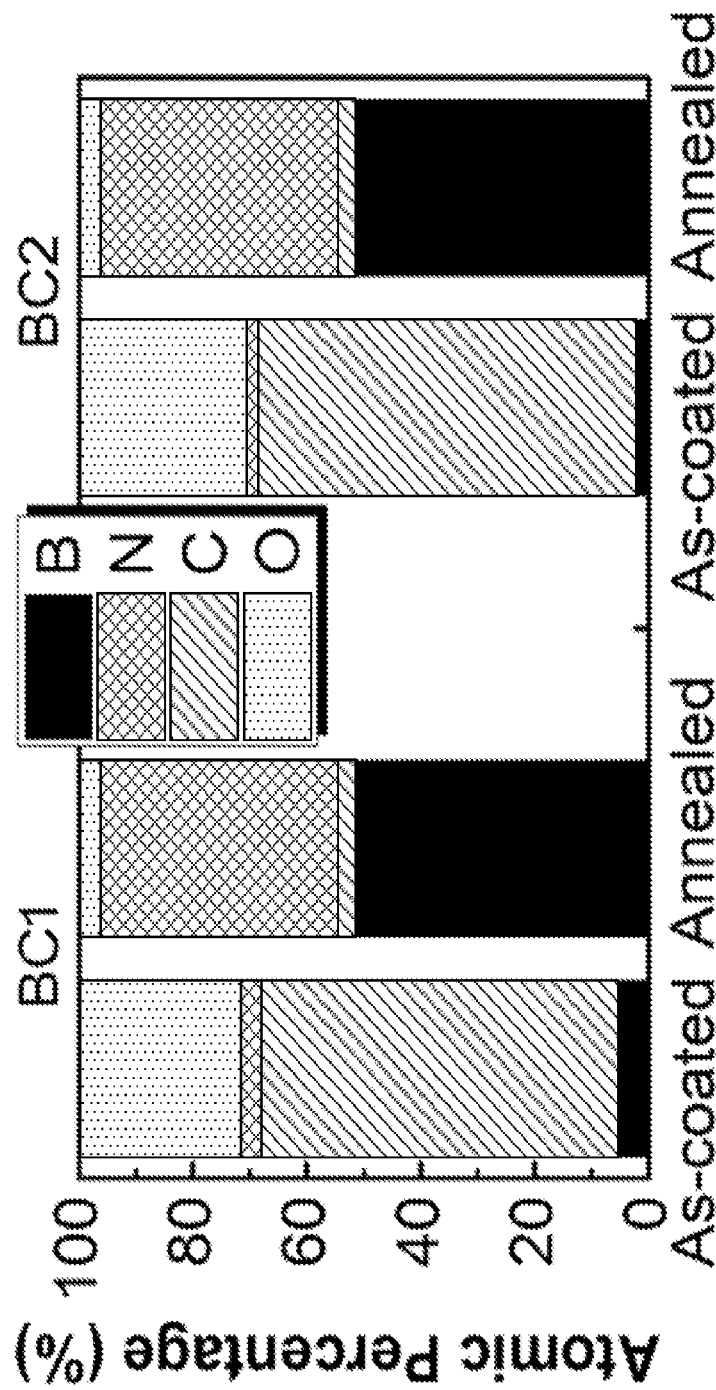
FIG. 4E: Atomic composition of the as-coated and annealed hBN films prepared from low-viscosity (BC1) and high-viscosity (BC2) hBN inks.
Figures 4F, 4G:
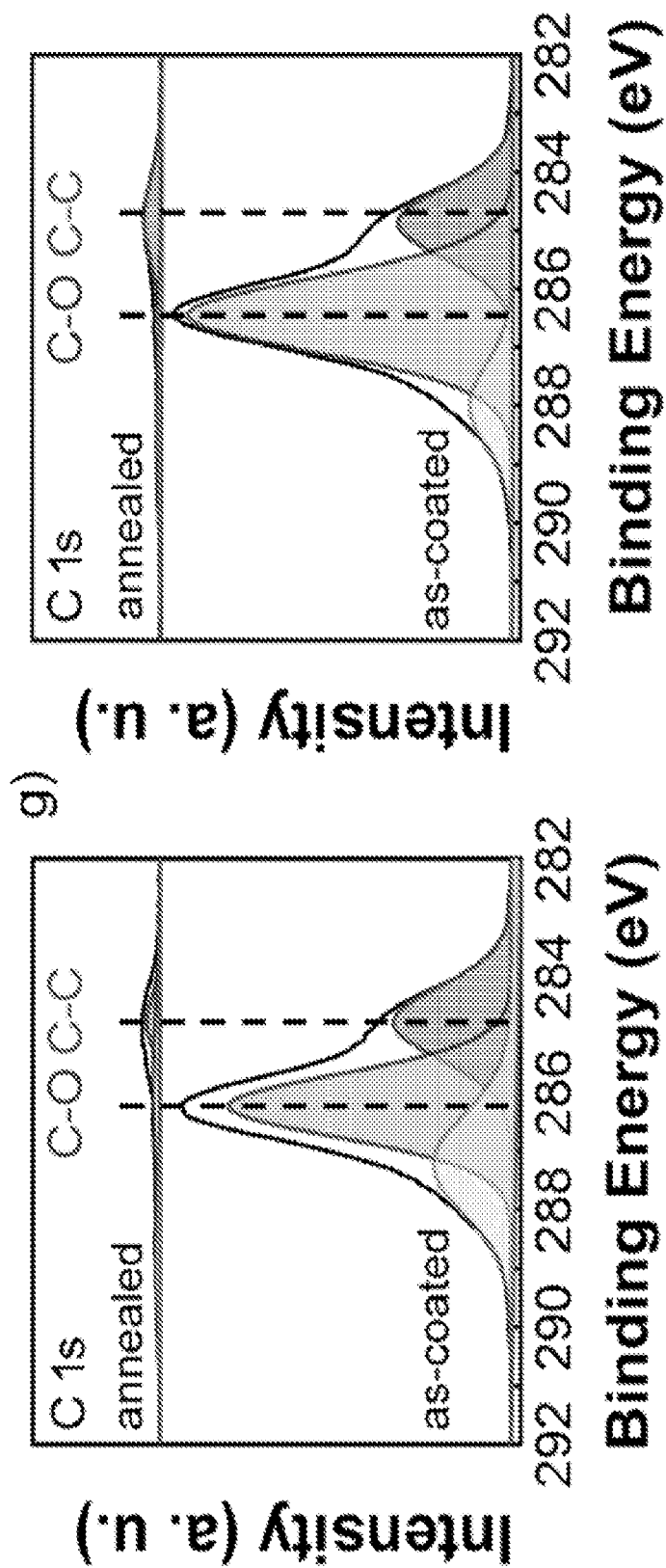
FIGS. 4F-4G: High-resolution C is XPS scan for the (FIG. 4F) low-viscosity and (FIG. 4G) high-viscosity hBN inks as-coated and after annealing.

Characterization of the chemical composition of the as-coated and thermally annealed hBN films is performed by X-ray photoelectron spectroscopy (XPS). The relative atomic percentages of carbon, oxygen, boron, and nitrogen obtained from XPS survey scans are shown in FIG. 4E. Both as-coated hBN films show evidence of the presence of the EC polymer, including high atomic percentages of C and O. The low relative content of B and N also reflects the large presence of the polymer dispersant in the as-coated films. However, following annealing, the C and O content is drastically reduced, and the relative content of B and N is correspondingly increased, indicating successful polymer decomposition. The high-resolution C 1s spectra further show that the carbonaceous components of the hBN films were altered following thermal annealing, as shown in FIGS. 4F-4G. Specifically, the C is spectra can be deconvoluted into three components that are assigned to C—C(about 285 eV), C—O (about 287 eV), and O—C=O (about 289 eV), leading to the conclusion that the thermal decomposition of the EC polymer results in carbonaceous residues composed primarily of C—C and C—O bonds.

The carbon coating on the hBN nanosheets enhances wettability towards organic electrolytes including those commonly employed in lithium-ion batteries. FIGS. 5A-5E compares the organic electrolyte wettability of blade-coated hBN films to that of a commercial lithium-ion battery separator (Celgard). When a droplet of organic electrolyte is placed on the surface of the blade-coated hBN film, it rapidly infiltrates the interior porous microstructure, resulting in complete wetting within 10 seconds. In contrast, the commercial separator shows considerably less wetting under the same testing conditions. High wettability is an essential property for a battery separator to efficiently transport ions between the electrodes and minimize the cell impedance. In addition, efficient wetting reduces the time required for electrolyte filling, which simplifies manufacturing and extends the battery life cycle.

Figure 12:
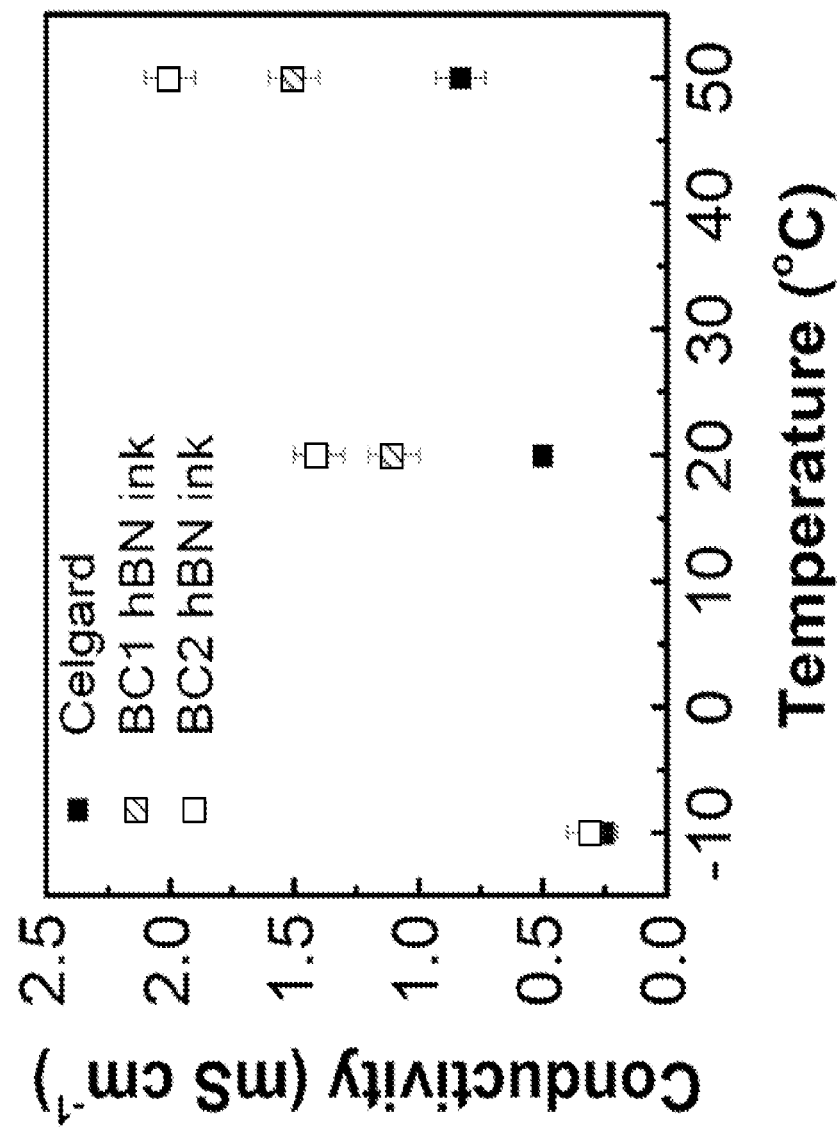
FIG. 12 shows temperature dependence of the ionic conductivity of hBN films and Celgard, according to embodiments of the invention. Ionic conductivity was measured over the temperature range of about −10° C. to about 50° C.

Porosity is another critical characteristic of a separator material since it facilitates ion transport and leads to enhanced ionic conductivity. SEM images shown in FIGS. 4A-4D reveal an interconnected porous microstructure of hBN films with the blade-coated hBN BC1 and BC2 films showing a porosity of about 60% and about 69%, respectively. For context, the commercially available separator displayed a lower porosity of about 38%, as shown in FIG. 5D. With high porosity and organic electrolyte wettability, the blade-coated hBN films possess ionic conductivity values in excess of about 1 mS cm$^{-1}$, which outperforms the commercial separator by more than a factor of two at room temperature, as shown in FIG. 5D. Measurements of the temperature dependence of ionic conductivity show the expected behavior of increasing ionic conductivity with increasing temperature, as shown in FIG. 12.

Figure 5E:
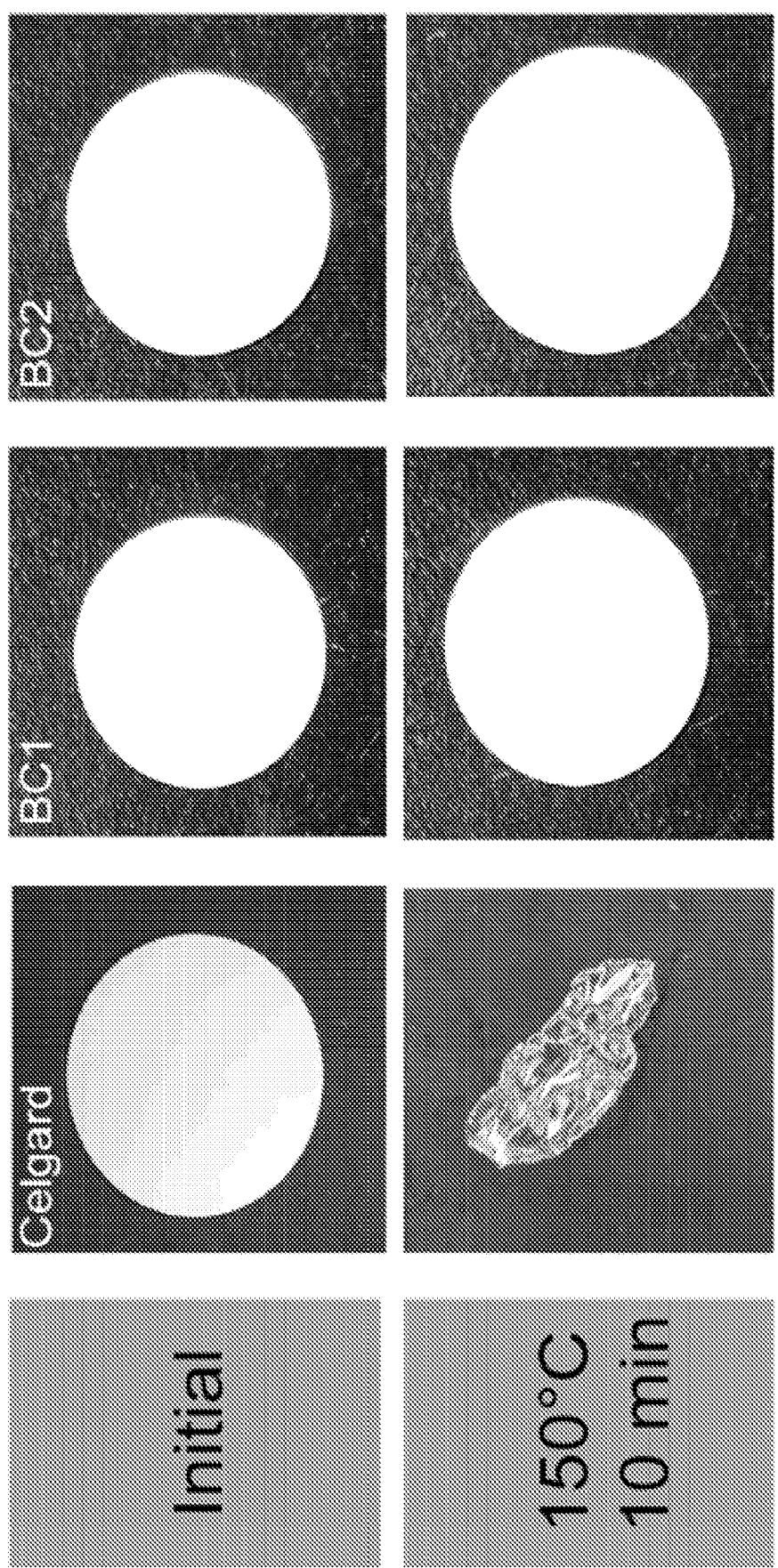
Figures 6A, 6B:
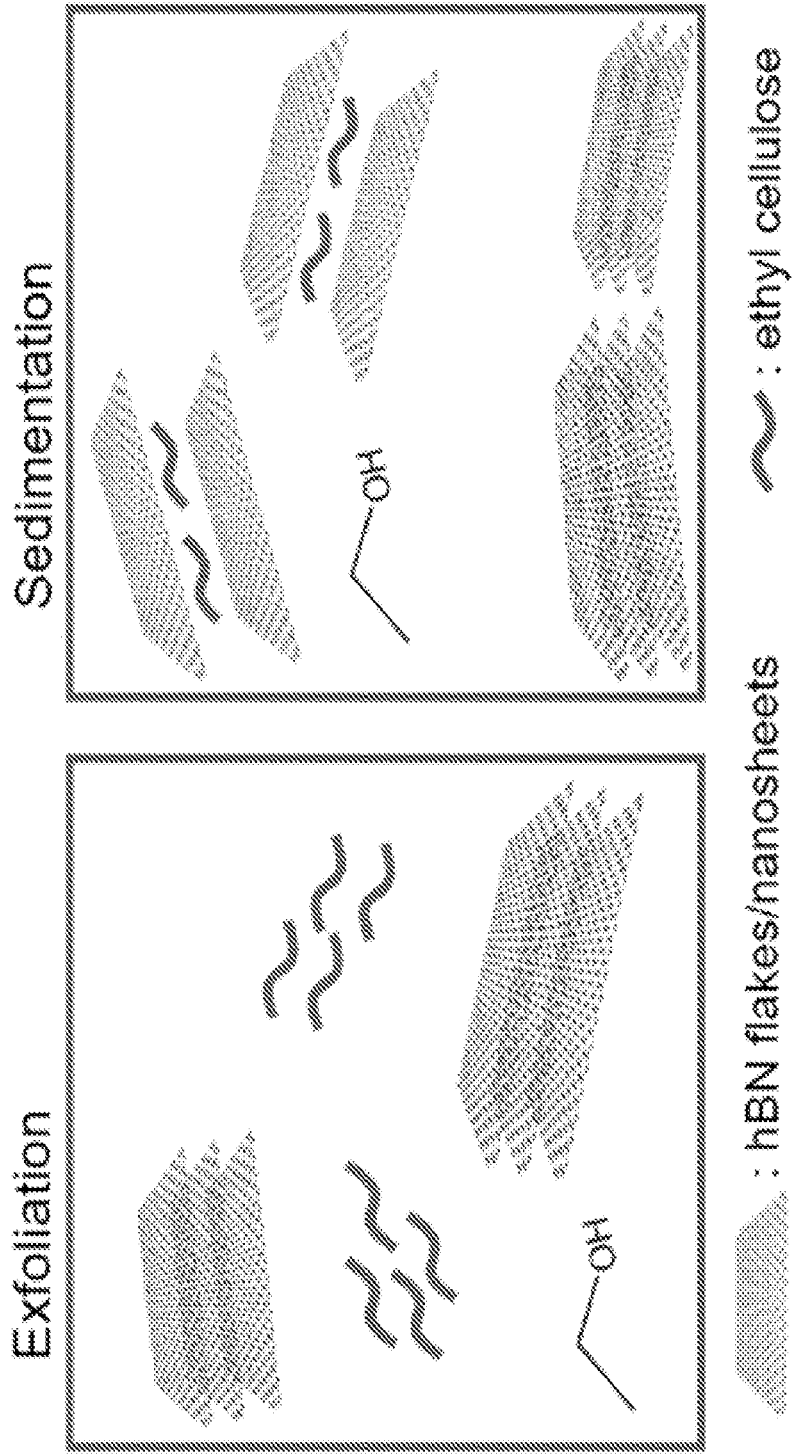
FIGS. 6A-6D show an illustrative scheme of the exfoliation process of hBN using ethyl cellulose (EC) polymer, according to embodiments of the invention.
Figure 6D:
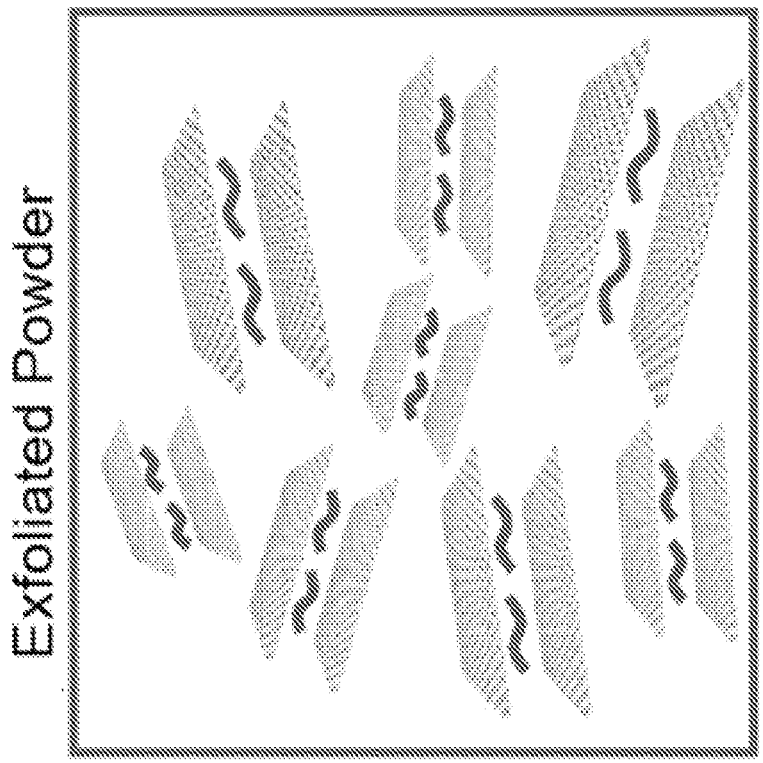
Figure 6C:
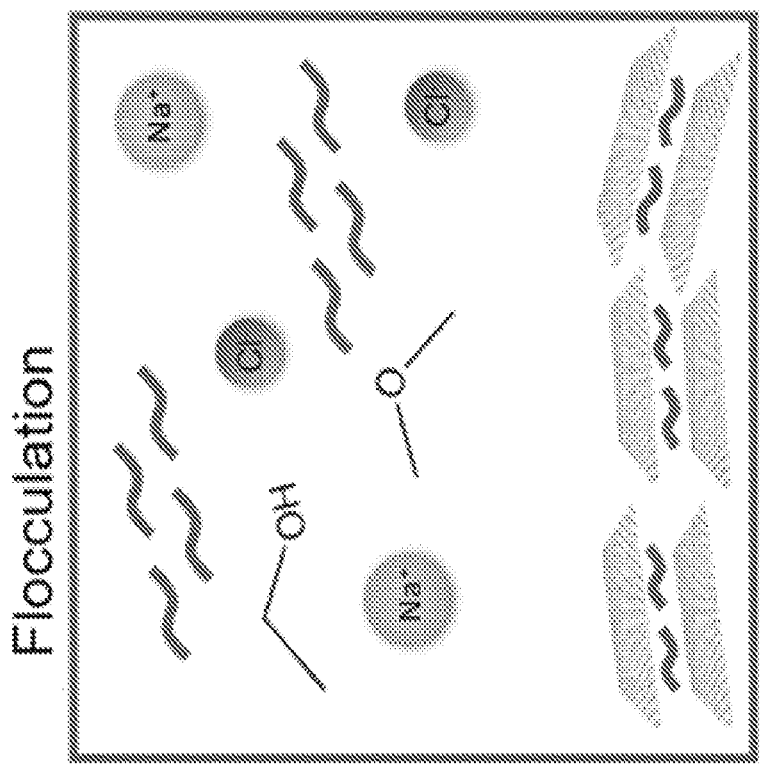
Figure 7:
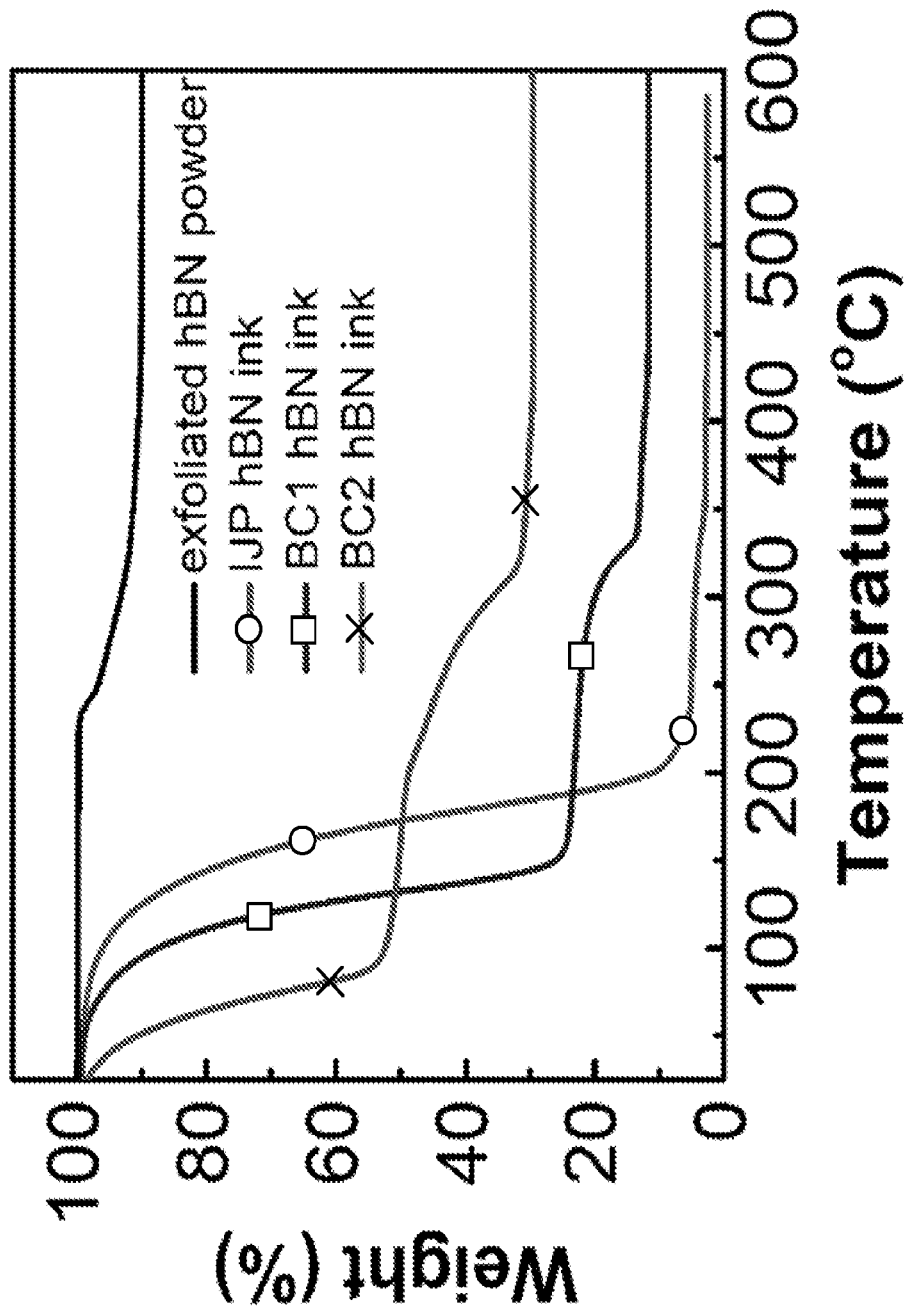
FIG. 7 shows thermogravimetric analysis (TGA) scans of exfoliated hBN/EC powder, blade-coatable (BC) and inkjet printable (IJP) hBN inks, according to embodiments of the invention. Samples were heated from about 25° C. to about 600° C. at a heating rate of about 10° C./minute under a synthetic air flow rate of about 50 m/min.

The thermal properties of the hBN films are compared to the commercial polymer-based separator in FIG. 5E. Following heating to about 150° C. for about 10 minutes on a hot plate, the commercial separator (Celgard) loses mechanical integrity and undergoes significant shrinkage, whereas the hBN films remained intact. This improved thermal stability results from the polymer-free composition of the annealed blade-coated hBN films and the superlative thermal and chemical stability of hBN nanosheets, which are stable up to about 1000° C. in oxidizing environments. This thermal stability underscores the utility of hBN films for applications where thermal runaway must be minimized, such as lithium-ion batteries in consumer electronics or electric vehicles.

The invention discloses, among other things, a scalable, polymer-stabilized method for liquid-phase hBN exfoliation and printable ink formulation. By controlling the ink rheology through choice of solvent system and EC loading, hBN nanosheets are successfully deposited by inkjet printing to create uniform, patterned lines on a variety of substrates. Moreover, due to the broad viscosity tunability of EC-stabilized hBN nanosheets, blade-coatable hBN inks are also demonstrated for large-area applications. Following thermal annealing, the EC polymer is largely volatized, resulting in high porosity films where the hBN nanosheets possess a carbonaceous coating that promotes organic electrolyte wettability. The combination of high porosity and organic electrolyte wettability leads to high ionic conductivity that competes favorably with commercial lithium-ion battery separators. In addition, the high thermal and chemical stability of hBN provides additional advantages by maintaining mechanical integrity at elevated temperatures, which helps mitigate thermal runaway concerns in lithium-ion batteries. Overall, embodiments of the invention establishes a series of viscosity-tunable hBN inks with high ionic conductivity that present promising opportunities for next-generation printed electronics and energy storage technologies.

Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Hexagonal Boron Nitride Exfoliation, Processing, and Characterization

In this exemplary example, about 120 g of bulk hBN flakes (Sigma-Aldrich) were dispersed in an about 800 mL solution of ethyl cellulose (EC, viscosity 4 cP, Sigma-Aldrich) dissolved in ethanol (about 0.015 g mL$^{-1}$, Decon Labs, 200 proof grade) and placed in a stainless steel beaker. The mixture was shear mixed (laboratory shear mixer model L5M-A, Silverson) for about 120 min at maximum speed (about 10,230 rpm) to exfoliate the hBN nanosheets. The resulting dispersion was centrifuged at about 4,000 rpm for about 20 min to sediment out large particles (Avanti J-26 XPI centrifuge, JS 7.5 rotor, Beckman Coulter). The supernatant containing ethanol, ethyl cellulose, and hBN nanosheets were collected. To remove excess EC and solvent, a flocculation method was employed. In this step, the supernatant was mixed with an aqueous sodium chloride solution (about 0.04 mg mL$^{-1}$ NaCl, Sigma-Aldrich) in an about 16:9 weight ratio and centrifuged for about 6 min at about 7,500 rpm to sediment the exfoliated hBN/EC. The sediment was washed with deionized water to remove residual salt and dried to yield the exfoliated hBN/EC powder (FIGS. 6A-6D).

Thermogravimetric analysis (TGA) was performed on the resulting powder, which revealed an hBN solid content of about 90 wt %. The TGA measurement was conducted over a temperature interval from about 25° C. to about 600° C. with a ramp of about 10° C. min$^{-1}$ under a synthetic air flow rate of about 50 mL min$^{-1}$ (Mettler Toledo TGA/SDTA851). Field-emission scanning electron microscopy (SEM, Hitachi SU8030 microscope operating at about 2 kV) was performed on samples coated with an about 7 nm thick layer of osmium tetroxide using a hollow cathode osmium plasma coater (model OPC-60A, Structure Probe, Inc.). The EC coating on the hBN nanosheets was confirmed by transmission electron microscopy (TEM) carried out on a JEOL JEM-2100 microscope at an accelerating voltage of about 200 kV. Tapping mode atomic force microscopy (AFM) imaging of the hBN nanosheets was performed on an Asylum Research Cypher AFM with a Nanoworld NCHR probe. The sample was prepared by dropping a diluted dispersion of hBN/EC in ethanol onto a previously cleaned Si/SiO$_2$ wafer.

Inks Preparation and Characterization

In this exemplary example, for inkjet printing, hBN/EC powder and EC (viscosity 4 cP, Sigma-Aldrich) were dispersed in about 85:15 v/v cyclohexanone/terpineol (Sigma-Aldrich) by bath sonication for about 6 h. The dispersion was further filtered through an about 3.1 μm glass fiber membrane (Whatman syringe filter) to prevent clogging of the inkjet nozzles, yielding an ink with about 5.1 wt % hBN solid loading and viscosity of about $8.0 \times 10^{-3}$ Pa·s at about 1000 $s^{-1}$. Inkjet printing was performed with a Ceradrop X-Serie inkjet printer equipped with an about 10 pL nominal drop size Dimatix cartridge (DMC-11610) using a Dimatix Model Fluid 2 waveform jetting parameter with the inkjet nozzle plate and substrate maintained at about 30° C. Glass slides (Fisherbrand, about 1 mm thick) and polyimide films (DuPont Kapton, about 125 μm thick) served as substrates and were used as received. Lateral resolution of the printed patterns was observed by optical microscopy (Olympus Optical Microscope) and SEM (Hitachi SU8030). Thicknesses measurements of the inkjet-printed lines were obtained using a Dektak 150 Stylus Surface Profiler.

Blade-coatable hBN inks were prepared by mixing exfoliated hBN/EC powder, EC (viscosity 4 cP, Sigma-Aldrich), ethanol (Decon Labs, 200 proof), and ethyl lactate (Sigma-Aldrich) by bath sonication for about 6-8 h. The dispersion was heated on a hot plate to evaporate ethanol, producing an ink with about 23 wt % solid content hBN in ethyl lactate and a viscosity of about 0.4 Pa·s at about 1000 $s^{-1}$. Further evaporation of solvents resulted in a higher viscosity blade-coatable hBN ink, with about 45 wt % solid content hBN in ethyl lactate and a viscosity of about 2.6 Pa·s at about 1000 $s^{-1}$. The shear viscosity of all inks was measured using an Anton Paar Physica MCR 302 rheometer equipped with an about 25 mm, 2° cone and plate geometry at shear rates from about 1 $s^{-1}$ to about 1000 $s^{-1}$ at about 25° C.

For blade coating, the hBN inks were deposited onto stainless steel disk substrates by dragging the film casting knife (EQ-Se-KTQ-50 film applicator with adjustable micrometer) using an automatic film coater (model MSK-AFA-III) at a speed of about 20 cm $s^{-1}$, producing homogeneous films with consistent thicknesses. hBN films were allowed to dry at room temperature overnight followed by thermal annealing at about 300° C. for about 30 min under ambient air conditions in a tube furnace (Lindberg Blue M, Thermo Fisher Scientific). SEM (Hitachi SU8030) images of hBN film surfaces and cross-sections were used to examine the resulting morphology. X-ray photoelectron spectroscopy (XPS) measurements were performed on an ESCALAB 250 XI+ spectrometer (Thermo Fisher Scientific) equipped with an electron flood gun and a scanning ion gun. Analysis of XPS data was performed using the ThermoAvantage software. The wettability of the blade-coated hBN films was estimated by a video contact angle system (VCA Optima). The measurements were carried out by dropping about 5 μL liquid electrolyte (about 1.0 M $LiPF_6$ in about 1:1 ethylene carbonate:diethyl carbonate (EC/DEC), battery grade, Sigma-Aldrich) on the hBN film surfaces. Image capture was recorded using Dynamic-2500 software at a rate of about 60 frames/second. The porosity of the hBN films was measured by the n-butanol absorption method. In this approach, hBN films were weighed before and after immersion in n-butanol (Sigma-Aldrich) for about 1 h. The porosity was then calculated using Equation (1):

$$\text{Porosity (\%)} = \frac{w_1 - w_0}{\rho \times V} \times 100 \quad (1)$$

Where $w_1$ and $w_0$ are the weight of wet and dry hBN films, respectively; ρ is the density of n-butanol; V is the geometric volume of the hBN film.

The ionic conductivity of the hBN films was measured by electrochemical impedance spectroscopy (EIS). For the assembly of cells used in the ionic conductivity measurements, a blade-coated hBN film on a stainless steel disk was wetted with liquid electrolyte (about 1.0 M $LiPF_6$ in EC/DEC, Sigma-Aldrich) and then sandwiched with another stainless steel disk electrode of equal size (Area=1.86 $cm^2$). The cells were allowed to age overnight prior to electrochemical measurements. Temperature-dependent measurements were carried out using an environmental chamber (model BTL-433, ESPEC) to precisely control sample temperature in the range from about –10° C. to about 50° C. The cells were allowed to equilibrate for about 30 min at each temperature before the measurement was recorded. Electrochemical measurements were performed using a potentiostat/galvanostat/EIS model SP-300 (Bio-Logic Science Instruments), applying an AC amplitude of about 10 mV over a frequency range from about 0.1 Hz to about 1 MHz. The ionic conductivity (σ) of the hBN films was calculated using Equation (2):

$$\sigma = \frac{t}{R \times A} \quad (2)$$

where t corresponds to the thickness of the hBN film; R is the resistance determined from EIS; A is the area of the stainless steel electrode.

Lithium-ion batteries have increasing demands for printed components such as separators. This functionality requires printed structures that are concurrently electrically insulating and ionically conductive. hBN meets the first requirement, and the second is addressed by incorporating multifunctional cellulosic polymers (i.e., ethyl cellulose) into the printable hBN inks that play several roles: (1) Promotes exfoliation and stabilization of hBN nanosheets; (2) Controls ink viscosity to enable compatibility with a wide range of printing methods ranging from inkjet printing to blade coating; (3) Upon thermal curing of the printed structure, the polymer is volatilized, resulting in a porous structure; (4) The cured polymer also leads to a nanoscale carbonaceous coating on the hBN nanosheets that promotes electrolyte wetting.

As disclosed in the disclosure, certain embodiments of the invention include viscosity-tunable hBN inks that are compatible with a wide range of printing methods that span the spectrum from low-viscosity inkjet printing to high-viscosity blade coating. The hBN inks are prepared by liquid-phase exfoliation with the polymer ethyl cellulose acting as both a dispersant and a stabilizing agent. Thermal annealing of the printed structures promotes volatilization of the polymer, resulting in a porous microstructure and the formation of a nanoscale carbonaceous coating on the hBN nanosheets, which promotes high wettability to battery electrolytes. The final result is a printed hBN nanosheet film that possesses high ionic conductivity, chemical and thermal stability, and electrically insulating character, which are an ideal set of characteristics for printable battery components such as separators and solid electrolytes. These advances lead to superior ionic conductivity that competes favorably with commercial lithium-ion battery separators and provide cost-effective pathways to scalable manufacturing.

The invention, among other things, has at least the following advantages over the existing technology.

Most printable ink formulations for 2D materials to date utilize harsh solvents (e.g., dimethylformamide, n-methyl- 2-pyrrolidone, and chloroform) or water-based stabilizers (e.g., pyrene sulfonic acid derivatives, Triton X-100, and xanthan gun), with limited control over viscosity. The ethyl cellulose-based formulation according to the invention leads to inks with a wide viscosity range, enabling diverse printing methods including spray coating, inkjet printing (viscosity~ 8 mPa·s), and blade coating (viscosity~ 400 mPa·s). The ethyl cellulose-based formulation according to the invention leads to inks with a wide viscosity range, enabling diverse printing methods including spray coating, inkjet printing (viscosity about 8 mPa·s), and blade coating (viscosity about 400 mPa·s).

Previous reports have shown ink formulations using bulk hBN sheets and viscosity control with rheology modifiers, while the hBN ink formulations according to the invention utilize multifunctional cellulosic polymers—namely ethyl cellulose (EC)—that promotes the liquid-phase exfoliation and stabilization of hBN nanosheets in addition to providing broad tunability of ink viscosity.

Previous reports on printed hBN only showed applications as dielectrics for electronics, which have limited competitive advantage compared to other dielectric inks and coatings (e.g., polyimide and polytetrafluoroethylene-based inks), whereas the alternative hBN nanosheet ink formulations according to the invention provide high ionic conductivity, which enables novel application areas such as energy storage applications.

The printed hBN structures according to the invention can serve as battery separators since they are concurrently electrically insulating and ionically conductive. The incorporation of EC into the formulation also imparts porosity control due to the volatilization of EC upon thermal curing of the films, resulting in a porous hBN microstructure. In addition, the thermal volatilization of EC leaves behind a nanoscale carbonaceous coating on the hBN nanosheets, which enhances wetting by organic solvents such as lithium-ion battery electrolytes.

Commercial polymer-based battery separators present low thermal stability, whereas the hBN films according to the invention present high thermal stability due to the polymer-free composition of the annealed hBN films and the superlative thermal and chemical stability of hBN nanosheets.

The invention may find applications in a variety of fields such as printable inks, batteries, sensors, supercapacitors, wearable devices, flexible electronics, printed electronics and energy storage applications.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1] K. Novoselov, D. Jiang, F. Schedin, T. Booth, V. Khotkevich, S. Morozov, A. Geim, *Proc. Natd. Acad. Sci. U.S.A.* 2,005,102, 10451.

[2] H. Zhang, *ACS Nano* 2015, 9, 9451.

[3] J. Kang, V. K. Sangwan, J. D. Wood, M. C. Hersam, *Acc. Chem. Res.* 2017, 50, 943.

[4] A. K. Geim, K. S. Novoselov, *Nat. Mater.* 2007, 6, 183.

[5] C. N. R. Rao, A. K. Sood, K. S. Subrahmanyam, A. Govindaraj, Angew. *Chem. Int. Ed.* 2009, 48, 7752.

[6] C. Tan, X. Cao, X.-J. Wu, Q. He, J. Yang, X. Zhang, J. Chen, W. Zhao, S. Han, G.-H. Nam, M. Sindoro, H. Zhang, *Chem. Res.* 2017, 117, 6225.

[7] C. R. Dean, A. F. Young, I. Meric, C. Lee, L. Wang, S. Sorgenfrei, K. Watanabe, T. Taniguchi, P. Kim, K. L. Shepard, *Nat. Nanotech.* 2010, 5, 722.

[8] M. Wang, S. K. Jang, W.-J. Jang, M. Kim, S.-Y. Park, S.-W. Kim, S.-J. Kahng, J.-Y. Choi, R. S. Ruoff, Y. J. Song, S. Lee, *Adv. Mater.* 2013, 25, 2746.

[9] T. Roy, M. Tosun, J. S. Kang, A. B. Sachid, S. B. Desai, M. Hettick, C. C. Hu, A. Javey, *ACS Nano* 2014, 8, 6259.

[10] J. Zhu, J. Kang, J. M. Kang, D. Jariwala, J. D. Wood, J. W. T. Seo, K. S. Chen, T. J. Marks, M. C. Hersam, *Nano Lett.* 2015, 15, 7029.

[11] Deepika, L. H. Li, A. M. Glushenkov, S. K. Hait, P. Hodgson, Y. Chen, *Sci. Rep.* 2014, 4, 7288.

[12] C. Zhi, Y. Bando, C. Tang, H. Kuwahara, D. Golberg, *Adv. Mater.* 2009, 21, 2889.

[13] W.-L. Song, P. Wang, L. Cao, A. Anderson, M. J. Meziani, A. J. Farr, Y.-P. Sun, *Angew. Chem.* 2012, 124, 6604.

[14] C. Yuan, B. Duan, L. Li, B. Xie, M. Huang, X. Luo, *ACS Appl. Mater. Interfaces* 2015, 7, 13000.

[15] J. Taha-Tijerina, T. N. Narayanan, G. Gao, M. Rohde, D. A. Tsentalovich, M. Pasquali, P. M. Ajayan, *ACS Nano* 2012, 6, 1214.

[16] F. Xiao, S. Naficy, G. Casillas, M. H. Khan, T. Katkus, L. Jiang, H. Liu, H. Li, Z. Huang, *Adv. Mater.* 2015, 27, 7196.

[17] L. Y. Niu, J. N. Coleman, H. Zhang, H. Shin, M. Chhowalla, Z. J. Zheng, *Small* 2016, 12, 272.

[18] V. Nicolosi, M. Chhowalla, M. G. Kanatzidis, M. S. Strano, J. N. Coleman, *Science* 2013, 340, 1226419.

[19] J. N. Coleman, M. Lotya, A. O'Neill, S. D. Bergin, P. J. King, U. Khan, K. Young, A. Gaucher, S. De, R. J. Smith, *Science* 2011, 331, 568.

[20] F. Bonaccorso, A. Lombardo, T. Hasan, Z. Sun, L. Colombo, A. C. Ferrari, *Mater. Today* 2012, 15, 564.

[21] J. Zhu, M. C. Hersam, *Adv. Mater.* 2017, 29, 1603895.

[22] F. Bonaccorso, A. Bartolotta, J. N. Coleman, C. Backes, *Adv. Mater.* 2016, 28, 6136.

[23] E. B. Secor, M. C. Hersam, *J. Phys. Chem. Lett.* 2015, 6, 620.

[24] Y. Aleeva, B. Pignataro, *J. Mater. Chem.* C 2014, 2, 6436.

[25] T. Carey, S. Cacovich, G. Divitini, J. Ren, A. Mansouri, J. M. Kim, C. Wang, C. Ducati, R. Sordan, F. Torrisi, *Nat. Commun.* 2017, 8, 1202.

[26] A. M. Joseph, B. Nagendra, E. Bhoje Gowd, K. P. Surendran, *ACS Omega* 2016, 1, 1220.
[27] A. M. Gaikwad, D. A. Steingart, T. N. Ng, D. E. Schwartz, G. L. Whiting, *Appl. Phys.* Lett. 2013, 102, 233302.
[28] A. M. Gaikwad, A. C. Arias, D. A. Steingart, *Energy Technol.* 2015, 3, 305.
[29] A. J. Blake, R. R. Kohlmeyer, J. O. Hardin, E. A. Carmona, B. Maruyama, J. D. Berrigan, H. Huang, M. F. Durstock, *Adv. Energy Mater.* 2017, 7, 1602920.
[30] V. Deimede, C. Elmasides, *Energy Technol.* 2015, 3, 453.
[31] Y. T. Liang, M. C. Hersam, *J. Am. Chem. Soc.* 2010, 132, 17661.
[32] E. B. Secor, T. Z. Gao, A. E. Islam, R. Rao, S. G. Wallace, J. Zhu, K. W. Putz, B. Maruyama, M. C. Hersam, *Chem. Mater.* 2017, 29, 2332.
[33] E. B. Secor, B. Y. Ahn, T. Z. Gao, J. A. Lewis, M. C. Hersam, *Adv. Mater.* 2015, 27, 6683.
[34] P. Calvert, *Chem. Mater.* 2001, 13, 3299.
[35] B. E. Kahn, *Proc. IEEE* 2015, 103, 497.
[36] Y.-H. Chang, S.-R. Tseng, C.-Y. Chen, H.-F. Meng, E.-C. Chen, S.-F. Horng, C.-S. Hsu, *Org. Electron.* 2009, 10, 741.
[37] E. B. Secor, P. L. Prabhumirashi, K. Puntambekar, M. L. Geier, M. C. Hersam, *J. Phys. Chem. Lett.* 2013, 4, 1347.
[38] X. Huang, *J. Solid State Electr.* 2011, 15, 649.
[39] P. Raghavan, X. Zhao, J.-K. Kim, J. Manuel, G. S. Chauhan, J.-H. Ahn, C. Nah, *Electrochim. Acta* 2008, 54, 228.
[40] N. Kostoglou, K. Polychronopoulou, C. Rebholz, *Vacuum* 2015, 112, 42.
[41] J. Ding, Y. Kong, P. Li, J. Yang, *J. Electrochem. Soc.* 2012, 159, A1474.

What is claimed is:

1. A two-dimensional (2D) insulating material based printable ink, comprising:
at least one solvent; and
an exfoliated composition dispersed in the at least one solvent, wherein the exfoliated composition comprises a 2D insulating material, and a dispersant and a stabilizing agent, wherein the dispersant and stabilizing agent comprises a cellulosic polymer, wherein the cellulosic polymer comprises ethyl cellulose, methyl cellulose, hydroxyethyl cellulose, carboxymethyl cellulose, hydroxypropylmethyl cellulose, nitrocellulose, or a combination of them, and the 2D insulating material comprises boron nitride nanosheets, borocarbonitrides (BCN), oxide nanosheets, layered perovskites, hydroxide nanosheets including hydrotalcite layered double hydroxides, natural clays including bentonites and/or montmorillonites, or a combination thereof, and wherein the at least one solvent comprises cyclopentanone and/or cycloheptanone and the 2D insulating material based printable ink is an ion-conductive and viscosity-tunable ink.

2. The 2D insulating material based printable ink of claim 1, wherein the 2D insulating material has an analogous honeycomb structure.

3. The 2D insulating material based printable ink of claim 1, wherein the boron nitride nanosheets comprise nanosheets of hexagonal boron nitride (hBN).

4. The 2D insulating material based printable ink of claim 1, wherein the oxide nanosheets comprise $Al_2O_3$, $TiO_2$, $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $HfSiO_4$, $La_2O_3$, $LaALO_3$, $BaTiO_3$, $SrTiO_3$, and $Ta_2O_5$, or a combination thereof.

5. The 2D insulating material based printable ink of claim 1, wherein the dispersant and stabilizing agent is adapted to promote liquid-phase exfoliation and stabilization of the 2D insulating material in the at least one solvent.

6. The 2D insulating material based printable ink of claim 1, wherein the dispersant and stabilizing agent is adapted to allow for broad tunability of ink viscosity so as to enable compatibility with diverse printing methods ranging from inkjet printing to blade coating.

7. The 2D insulating material based printable ink of claim 1, wherein the dispersant and stabilizing agent is adapted such that thermal volatilization of the dispersant and stabilizing agent results in a nanoscale carbonaceous coating on the 2D insulating material so as to promote organic electrolyte wettability of a printed structure.

8. The 2D insulating material based printable ink of claim 7, wherein the dispersant and stabilizing agent is adapted such that the printed structure has a porous microstructure.

9. The 2D insulating material based printable ink of claim 1, wherein the at least one solvent further comprises cyclohexanone, terpineol, cyclohexanol, chloroform, n-alkanes, terpenes, terpene alcohols, or a combination of them.

10. The 2D insulating material based printable ink of claim 1, wherein the at least one solvent further comprises ethanol, ethyl lactate, alkyl alcohols, ethyl 2-hydroxypropanoate, 2-hydroxypropanoic acid, propionate, lactate esters, ethyl esters, lactic acids, or a combination of them.

* * * * *